US011237062B2

(12) United States Patent
Akaba et al.

(10) Patent No.: US 11,237,062 B2
(45) Date of Patent: Feb. 1, 2022

(54) TEMPERATURE DETECTION DEVICE AND ASSEMBLY THEREOF

(71) Applicant: SHIBAURA ELECTRONICS CO., LTD., Saitama (JP)

(72) Inventors: Hiroaki Akaba, Saitami (JP); Takamasa Yoshihara, Saitami (JP); Atsushi Takahashi, Saitami (JP)

(73) Assignee: SHIBAURA ELECTRONICS CO., LTD., Saitama (JP)

( * ) Notice: Subject to any disclaimer, the term of this patent is extended or adjusted under 35 U.S.C. 154(b) by 384 days.

(21) Appl. No.: 16/486,273

(22) PCT Filed: Jan. 25, 2019

(86) PCT No.: PCT/JP2019/002410
§ 371 (c)(1),
(2) Date: Aug. 15, 2019

(87) PCT Pub. No.: WO2019/187570
PCT Pub. Date: Oct. 3, 2019

(65) Prior Publication Data
US 2021/0364364 A1    Nov. 25, 2021

(30) Foreign Application Priority Data
Mar. 30, 2018  (WO) .................. PCT/JP2018/013876

(51) Int. Cl.
*G01K 7/00*   (2006.01)
*G01K 1/14*   (2021.01)
(Continued)

(52) U.S. Cl.
CPC .................. *G01K 1/14* (2013.01); *G01K 7/16* (2013.01); *H02K 11/25* (2016.01)

(58) Field of Classification Search
CPC . G01K 1/14; G01K 7/16; H02K 11/25; H02K 2203/06
See application file for complete search history.

(56) References Cited

U.S. PATENT DOCUMENTS 5,397,859 A    3/1995  Robertson et al.
10,436,648 B2 * 10/2019 Yoshihara .............. H02K 11/25
(Continued)

FOREIGN PATENT DOCUMENTS

CN    104113165 A    10/2014
CN    108885142 A  * 11/2018 ............. H02K 11/25
(Continued)

OTHER PUBLICATIONS

International Search Report for PCT/JP2019/002410 dated Feb. 19, 2019.
(Continued)

*Primary Examiner* — Gail Kaplan Verbitsky
(74) *Attorney, Agent, or Firm* — Pearne & Gordon LLP

(57) ABSTRACT

A temperature detection device according to the present invention can improve assembling workability to a coil. A temperature detection device 1 includes a temperature sensor 10 that includes a thermosensitive element 111 detecting temperature of a coil 8, a holder 20 that holds the temperature sensor 10 and positions the coil 8 with respect to the temperature sensor 10, and a clip 30 as an elastic body configured to sandwich the temperature sensor 10 and the coil 8 that are positioned by the holder 20. The clip 30 is movable to an attachment position where the clip 30 is attached to the holder 20 to sandwich the temperature sensor 10 and the coil 8, and a separated position where the clip 30 is separated from the temperature sensor 10 when the coil 8 is positioned with respect to the temperature sensor 10 by the holder 20.

18 Claims, 18 Drawing Sheets

(51) Int. Cl.
   *H02K 11/25*   (2016.01)
   *G01K 7/16*   (2006.01)

(56) References Cited

U.S. PATENT DOCUMENTS

| | | | |
|---|---|---|---|
| 10,712,207 B2 * | 7/2020 | Yoshihara | ................ G01K 7/22 |
| 2018/0017446 A1 | 1/2018 | Yoshihara | |
| 2020/0259401 A1 * | 8/2020 | Baba | ...................... H02K 11/25 |
| 2021/0211022 A1 * | 7/2021 | Schmitt | .................... G01K 1/14 |

FOREIGN PATENT DOCUMENTS

| | | | | | |
|---|---|---|---|---|---|
| CN | 212627552 U | * | 2/2021 | | |
| DE | 102018208384 A1 | * | 11/2019 | ............. | H02K 11/25 |
| DE | 102018119831 A1 | * | 2/2020 | ............. | H02K 11/25 |
| DE | 102019124035 A1 | * | 3/2021 | | |
| FR | 2995739 A1 | * | 3/2014 | | |
| JP | S626291 Y2 | * | 2/1987 | | |
| JP | H07-193964 A | | 7/1995 | | |
| JP | 2014160023 A | | 9/2014 | | |
| JP | 2015-21936 A | | 2/2015 | | |
| JP | 6005893 B1 | | 9/2016 | | |
| WO | WO-2016120929 A1 | * | 8/2016 | ............... | G01K 1/16 |
| WO | WO2017207182 A | * | 12/2017 | | |
| WO | WO-2018189813 A1 | * | 10/2018 | ............. | H02K 5/08 |
| WO | WO-2019187570 A1 | * | 10/2019 | ............. | G01K 13/08 |
| WO | WO-2020026394 A1 | * | 2/2020 | ............. | G01K 1/16 |
| WO | WO-2020121392 A1 | * | 6/2020 | ............. | F24C 3/12 |

OTHER PUBLICATIONS

Written Opinion for PCT/JP2019/002410 dated Feb. 19, 2019.
Supplementary European Search Report for EP 19 75 2413 dated Nov. 30, 2020.

* cited by examiner

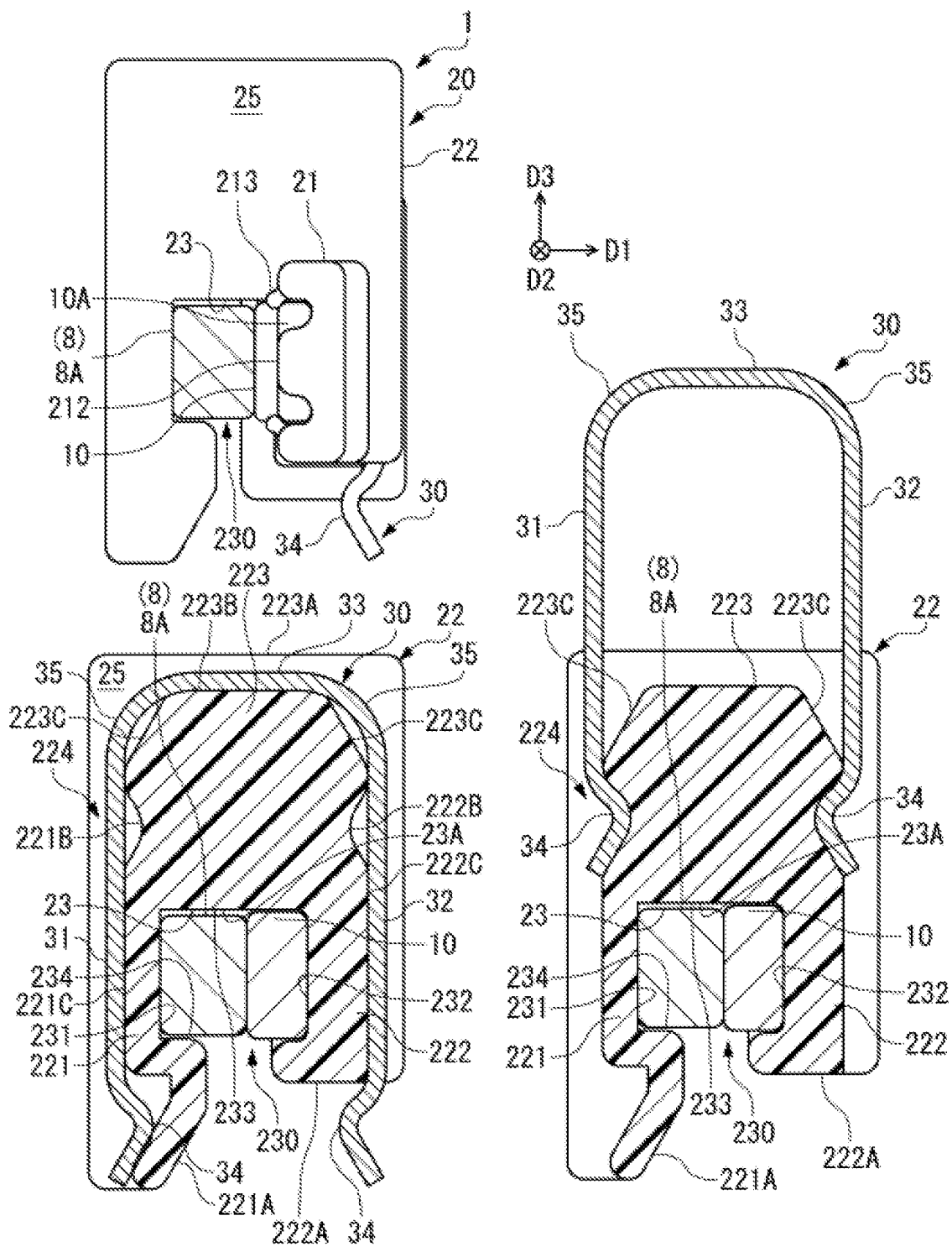

FIG. 7A
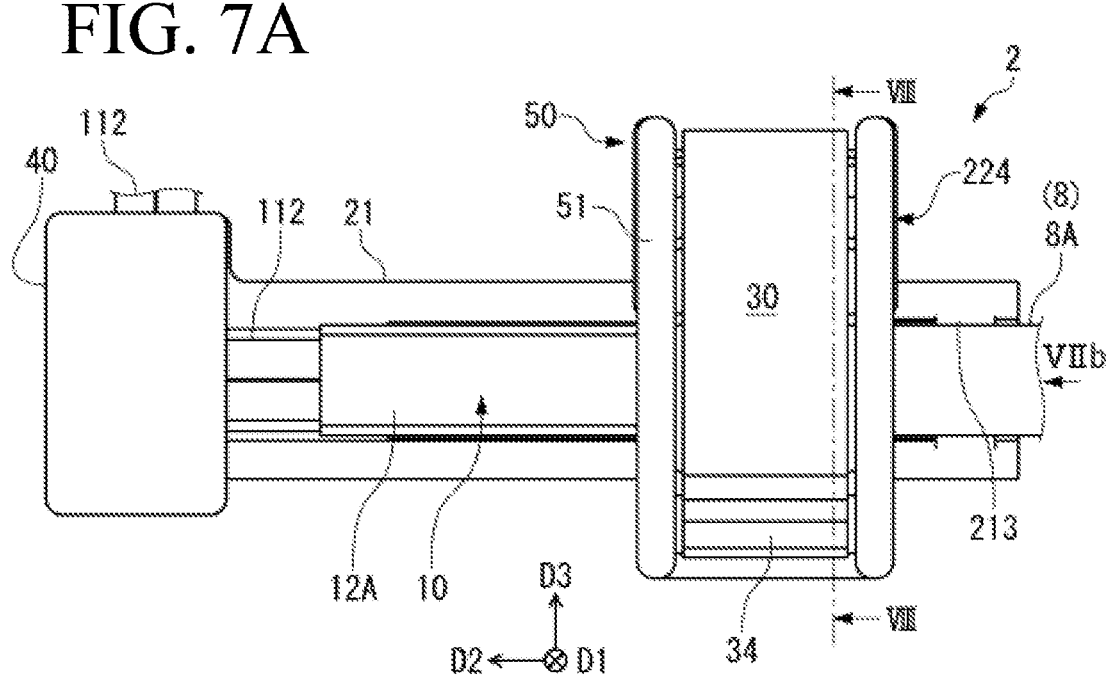
FIG. 7B
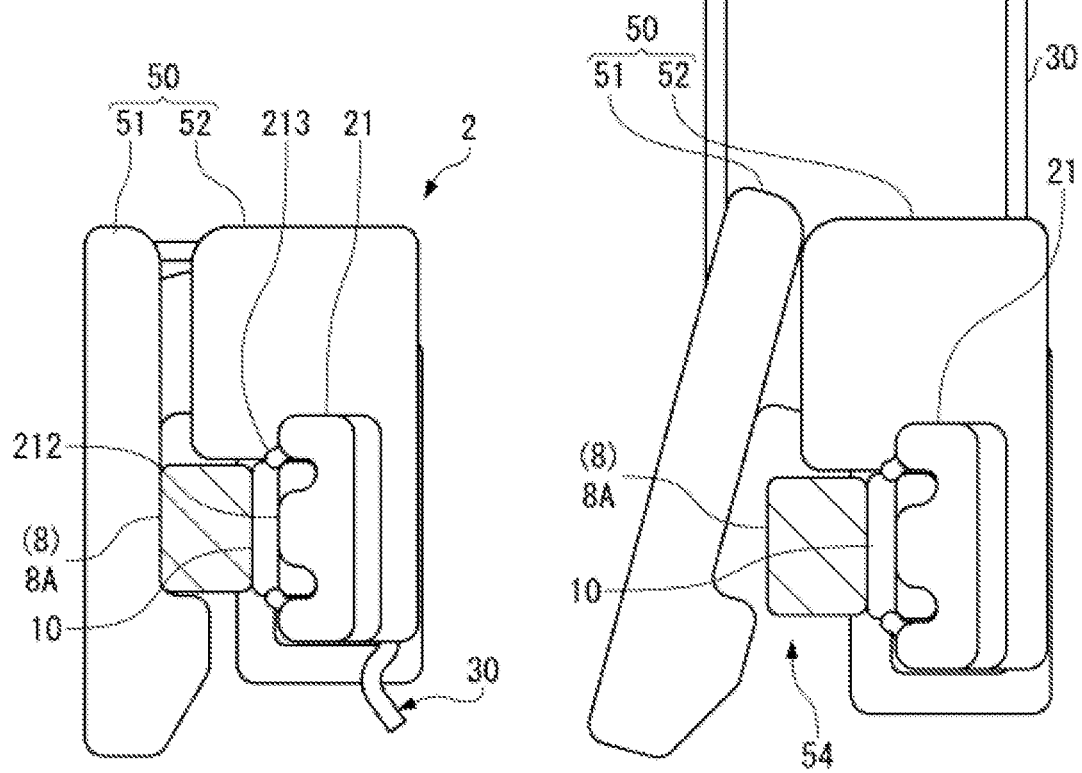
FIG. 7C

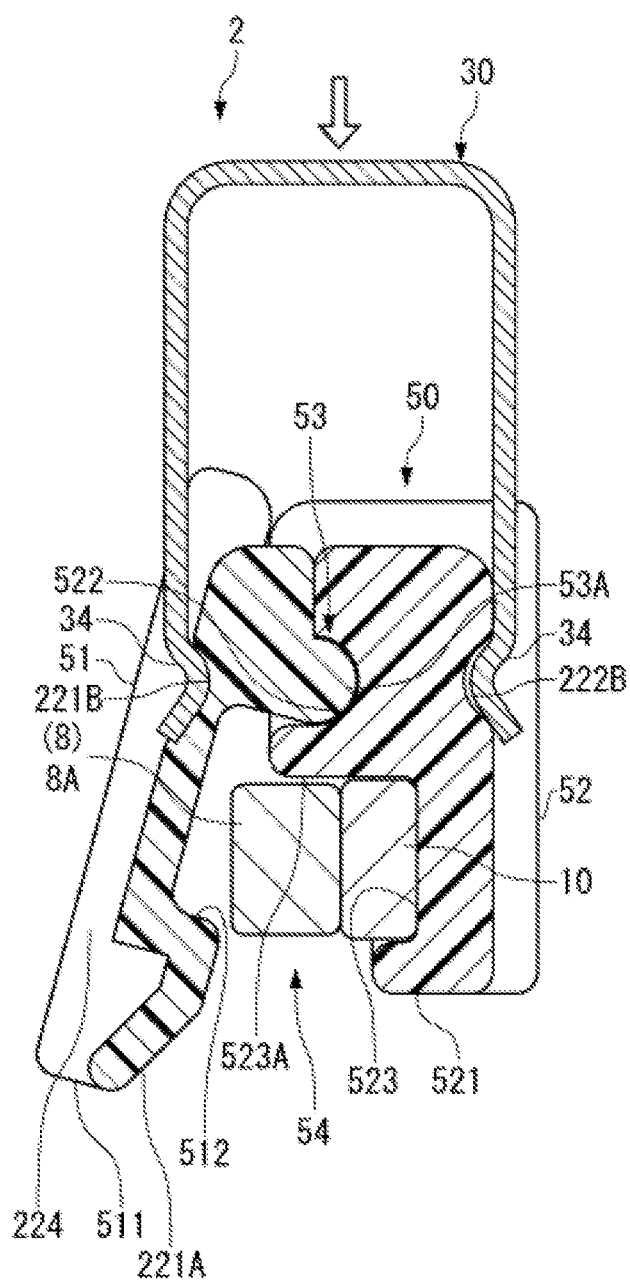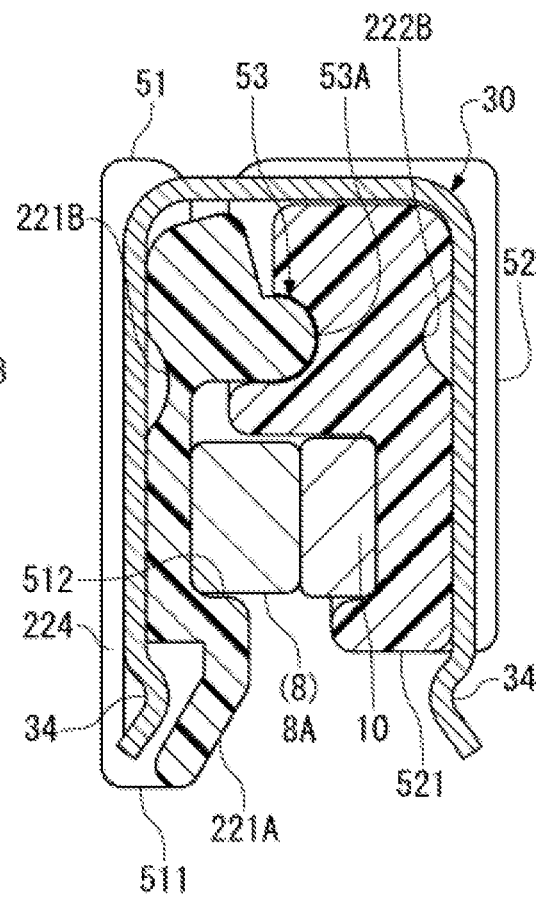

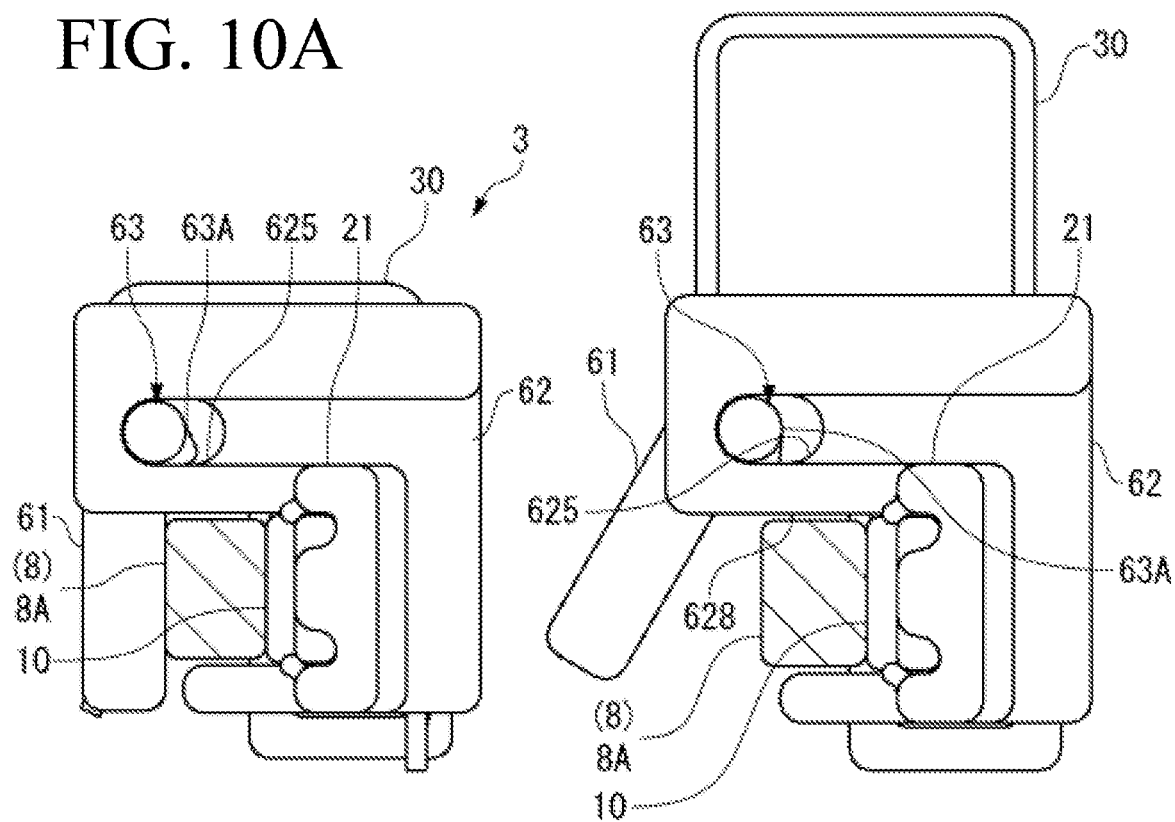

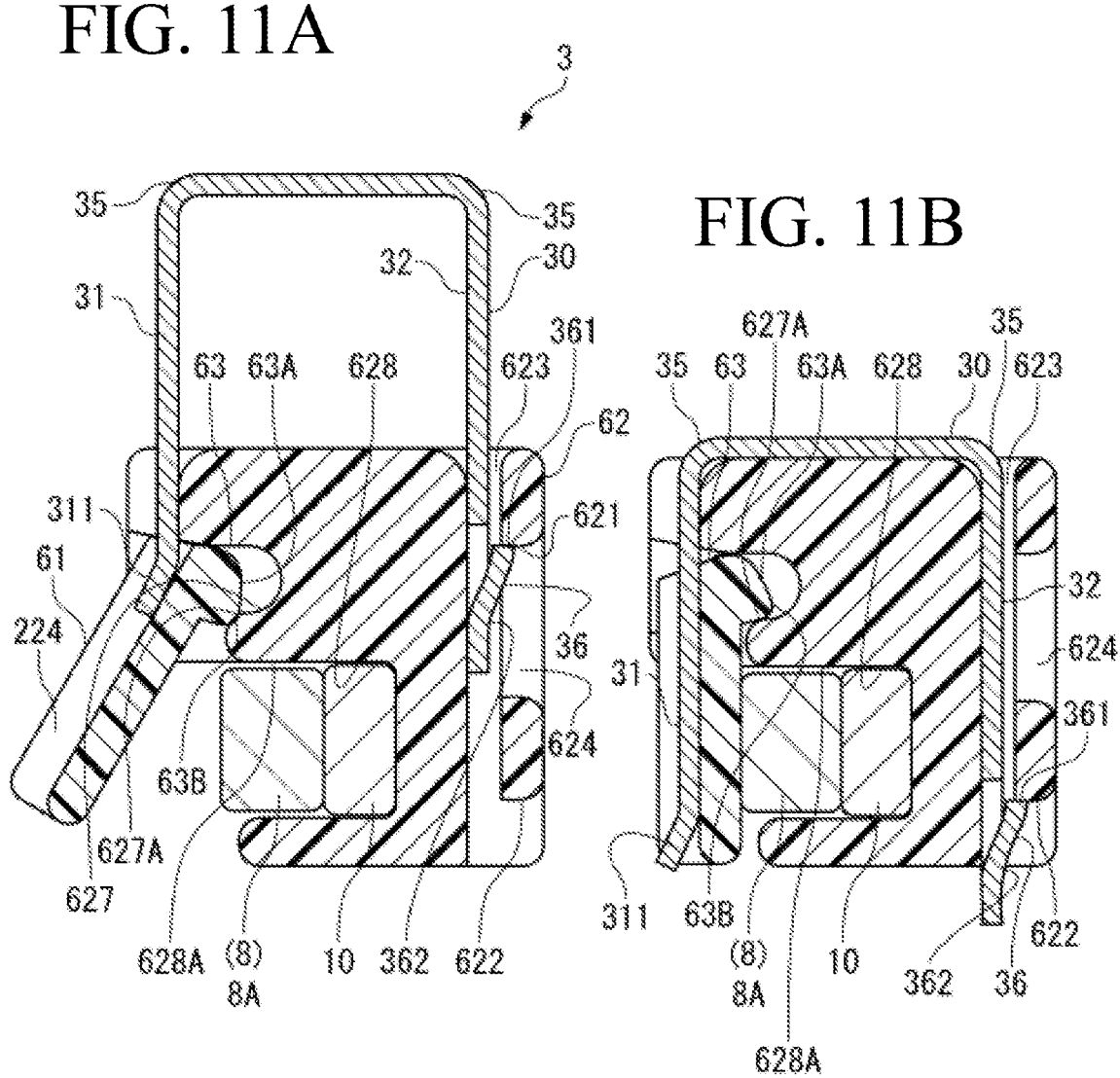

TEMPERATURE DETECTION DEVICE AND ASSEMBLY THEREOF

This is the National Stage of PCT international application PCT/JP2019/002410 filed on Jan. 25, 2019, which claims priority from PCT/JP2018/013876 filed on Mar. 30, 2018, the content of each of which is incorporated herein by reference in its entirety.

TECHNICAL FIELD

The present invention relates to a temperature detection device used to detect temperature of a coil.

BACKGROUND ART

To detect temperature of a coil provided in a stator of a rotary electric machine, a temperature sensor is used (Patent Literature 1). The temperature sensor disclosed in Patent Literature 1 includes a holder provided on a sensor body, and a C-shaped clip, one side of which is fixed to the holder. The temperature sensor can be assembled to a flat square coil by sandwiching the coil between the holder and the clip. When the coil is inserted between the holder and the clip, a sensor body is pressed against the coil by elastic force of the bent clip.

CITATION LIST

Patent Literature

Patent Literature 1
JP 6005893 B2

SUMMARY OF INVENTION

Technical Problem

To assemble the temperature sensor disclosed in Patent Literature 1 to the coil, it is necessary to insert the coil unfixed in position up to a position facing the sensor body between the holder and the clip while expanding a gap between the holder and the clip by the coil against the elastic force of the clip. Therefore, there is room for improvement in assembling workability.

An object of the present invention is to improve assembling workability of the temperature sensor to the coil.

Solution to Problem

According to the present invention, a temperature detection device to be assembled to a coil includes a temperature sensor that includes a thermosensitive element detecting temperature of the coil, a holder that holds the temperature sensor and positions the coil with respect to the temperature sensor, and an elastic body configured to sandwich the temperature sensor and the coil that are positioned by the holder. The elastic body is movable to an attachment position where the elastic body is attached to the holder to sandwich the temperature sensor and the coil, and a separated position where the elastic body is separated from the temperature sensor when the coil is positioned with respect to the temperature sensor by the holder.

In the present specification, the term "sandwich" is used to indicate that the temperature sensor and the coil are sandwiched and the temperature sensor and the coil are brought into contact with each other to enable the temperature sensor to detect the temperature of the coil, and does not necessarily indicates that the temperature sensor and the coil are pressed.

It is sufficient to maintain a state where the temperature sensor can detect the temperature of the coil without coming-off of the coil and the temperature sensor to outside of the temperature detection device due to external force applied to the temperature detection device in use. The temperature sensor and the coil may be sandwiched in a state (unloaded state) where stress does not act on the temperature sensor and the coil.

To more surely prevent displacement between the temperature sensor and the coil, the temperature sensor and the coil may be pressed against each other.

The term "sandwich" described herein is also used in a similar manner not only for the elastic body but also for the holder.

In the temperature detection device according to the present invention, the elastic body is preferably attached to the holder to be movable between the separated position and the attachment position.

In the temperature detection device according to the present invention, the holder preferably includes a guide guiding the elastic body for movement between the separated position and the attachment position.

In the temperature detection device according to the present invention, the holder preferably includes at least one of a locking portion that locks the elastic body to the separated position, and a locking portion that locks the elastic body to the attachment position.

In the temperature detection device according to the present invention, one of the locking portion and a locked portion of the elastic body locked by the locking portion is preferably a latch arm that is locked to the other of the locking portion and the locked portion and prevents the elastic body from coming off from the holder.

In the temperature detection device according to the present invention, the holder preferably includes a concave portion into which the coil is inserted, and the coil is preferably positioned with respect to the temperature sensor by an inner wall of the concave portion.

In the temperature detection device according to the present invention, the holder preferably includes a first holder that is located on one side in a sandwiching direction, and a second holder that is located on another side in the sandwiching direction. The sandwiching direction is a direction in which the temperature sensor and the coil are sandwiched by the elastic body. The first holder and the second holder are preferably relatively rotatable around a shaft of a hinge. The coil is preferably insertable into a gap between the first holder and the second holder while the elastic body is separated from the temperature sensor.

In the temperature detection device according to the present invention, the holder preferably includes a locking portion that locks the elastic body to the separated position, the shaft of the hinge is preferably located near the locking portion, and the first holder and the second holder are preferably assembled, by the elastic body separated from the temperature sensor, to be relatively rotatable around the shaft of the hinge.

In the temperature detection device according to the present invention, the hinge is preferably provided integrally with one of the first holder and the second holder, and the shaft of the hinge preferably includes a rotation regulation portion that is pressed against the other of the first holder and the second holder to regulate relative rotation of the first holder and the second holder.

In the temperature detection device according to the present invention, the hinge is preferably provided integrally with one of the first holder and the second holder, the other of the first holder and the second holder preferably includes an engagement portion with which the shaft of the hinge engages, and the first holder and the second holder are preferably assembled by the shaft of the hinge and the engagement portion.

In the temperature detection device according to the present invention, the holder preferably sandwiches and positions the temperature sensor and the coil, and the elastic body preferably sandwiches the temperature sensor and the coil from outside of the holder through the holder.

In the temperature detection device according to the present invention, the holder preferably includes a guide guiding the elastic body for movement between the separated position and the attachment position, and the elastic body is preferably a clip formed in a concave shape from a plate member, and is mated with the guide at the attachment position.

In the temperature detection device according to the present invention, the holder preferably includes a concave portion into which the coil is inserted, the concave portion is preferably opened on one side in a sandwiching direction when the elastic body is located at the separated position, the sandwiching direction is a direction in which the temperature sensor and the coil are sandwiched by the elastic body, and the elastic body is preferably configured to face an opening of the concave portion by being moved from the separated position to the attachment position.

In the temperature detection device according to the present invention, the elastic body is preferably mounted with an insulating contact member that is moved with the elastic body and comes into contact with the coil when the elastic body is moved to the attachment position.

In the temperature detection device according to the present invention, one of the contact member and the elastic body preferably includes a latch arm to be locked to the other of the contact member and the elastic body.

The temperature detection device according to the present invention preferably further includes a wire holding portion provided on the holder, the thermosensitive element preferably includes a thermosensitive body detecting temperature, and an electric wire led from the thermosensitive body, the elastic body preferably sandwiches the temperature sensor and the coil at a position corresponding to the thermosensitive body, and the wire holding portion preferably holds the electric wire to the holder.

In the temperature detection device according to the present invention, the elastic body is preferably movable along a direction orthogonal to both of a sandwiching direction in which the temperature sensor and the coil are sandwiched, and a longitudinal direction of a part of the coil to which the temperature detection device is assembled.

An assembly according to the present invention includes a temperature detection device to be assembled to a coil, and a coil element configuring a part of the coil. The temperature detection device includes a temperature sensor that includes a thermosensitive element detecting temperature of the coil, a holder that holds the temperature sensor and positions the coil with respect to the temperature sensor, and an elastic body configured to sandwich the temperature sensor and the coil that are positioned by the holder. The elastic body is movable to an attachment position where the elastic body is attached to the holder to sandwich the temperature sensor and the coil, and a separated position where the elastic body is separated from the temperature sensor when the coil is positioned with respect to the temperature sensor by the holder.

Advantageous Effects of Invention

According to the present invention, the coil is positioned by the holder while the elastic body is separated from the temperature sensor, and the elastic body is thereafter moved to the attachment position where the elastic body sandwiches the temperature sensor and the coil, which makes it possible to easily assemble the temperature sensor to the coil.

BRIEF DESCRIPTION OF DRAWINGS

FIG. 5A is a diagram illustrating the temperature detection device from a direction of an arrow Va of FIG. 1, FIG. 5B is a cross-sectional view taken along a line Vb-Vb of FIG. 2A, and FIG. 5C is a cross-sectional view illustrating the temperature detection device in a state where a clip (elastic body) is retreated.

FIG. 7A is a side view illustrating a temperature detection device according to a second embodiment, a coil being illustrated on right side of a sensor holding portion and a temperature sensor being illustrated on left side, FIG. 7B is a diagram illustrating the temperature detection device from a direction of an arrow VIIb of FIG. 7A, and FIG. 7C is a diagram illustrating the temperature detection device in a state where a clip is moved upward.

FIGS. 8A and 8B are cross-sectional views at a position corresponding to a line VIII-VIII of FIG. 7A, illustrating a procedure of assembling the temperature detection device to the coil.

FIG. 10A is a diagram illustrating the temperature detection device from a direction of an arrow X of FIG. 9A, and FIG. 10B is a diagram illustrating the temperature detection device in a state where a clip is moved upward.

FIGS. 11A and 11B are cross-sectional views at a position corresponding to a line XI-XI of FIG. 9A, illustrating a procedure of assembling the temperature detection device to a coil.

DESCRIPTION OF EMBODIMENTS

Some embodiments of the present invention are described below with reference to accompanying drawings.

A temperature detection device according to each of the embodiments described below is assembled to a coil of a stator provided in a rotary electric machine such as a motor to be mounted on a vehicle such as an automobile, in order to measure temperature of the coil.

First Embodiment

A temperature detection device 1 according to a first embodiment is described with reference to FIG. 1 to FIG. 6.

Figure 1:
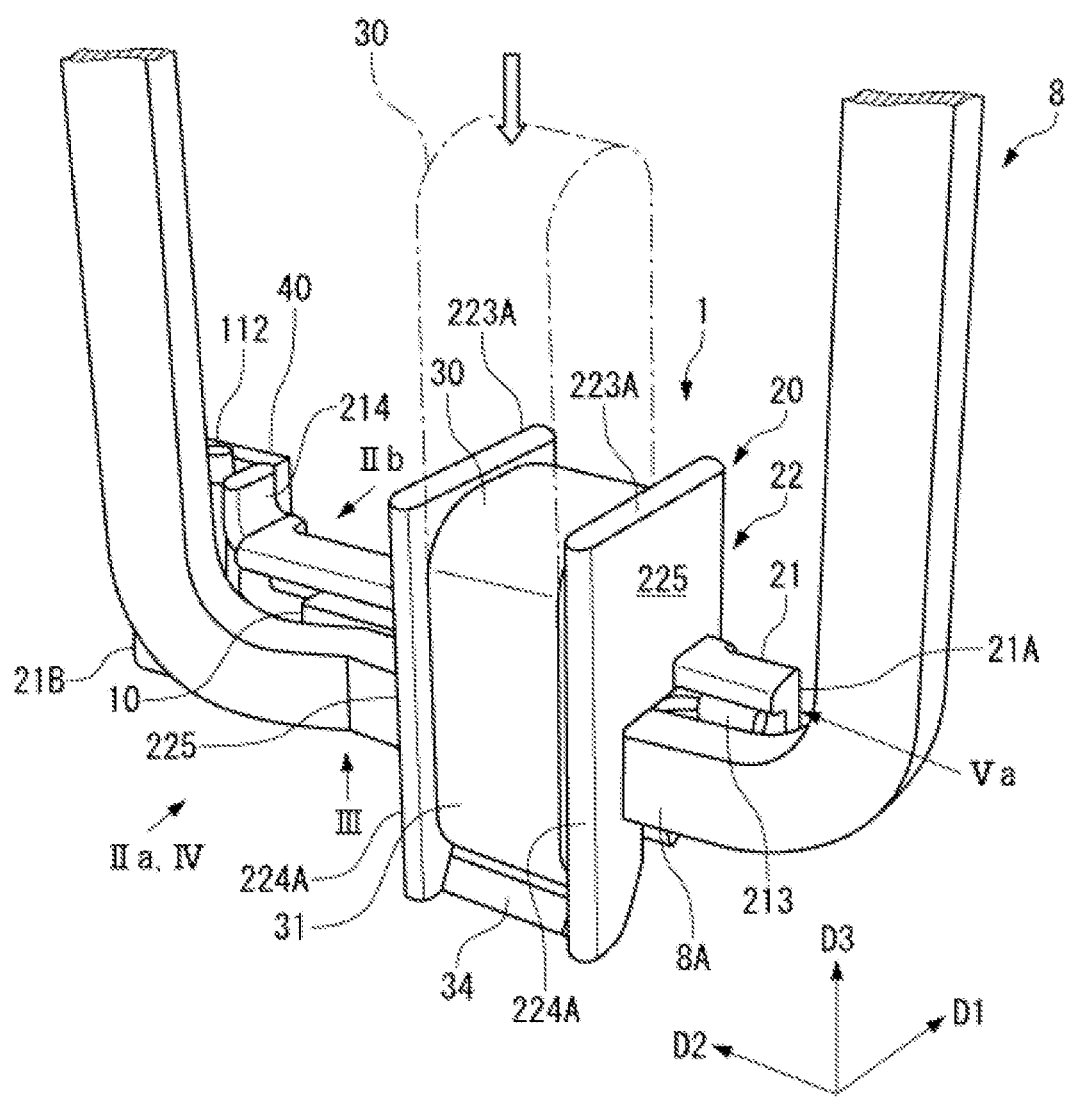
FIG. 1 is a perspective view illustrating a temperature detection device according to a first embodiment.

FIG. 1 illustrates the temperature detection device 1 assembled to a coil 8 of a stator to which an alternating current is applied.

FIG. 1 illustrates a part of the coil 8. The part of the coil 8 (hereinafter, referred to as coil element) illustrated in FIG. 1 corresponds to a neutral line led from an unillustrated neutral point of u, v, and w phases. The temperature detection device 1 is assembled to a linearly-extending part (hereinafter, referred to as extending part 8A) of the coil 8. A temperature sensor 10 of the temperature detection device 1 is held by a holder 20, and is disposed at a position facing the coil 8. The coil 8 is curved on both sides of the extending part 8A to which the temperature detection device 1 is assembled.

As illustrated in FIG. 5A, the coil 8 is made of a metal material in a flat square shape, and has a substantially rectangular cross-section. The extending part 8A of the coil 8 is inserted into the temperature detection device 1 from above in FIG. 1, and the coil 8 and the temperature sensor 10 are sandwiched by a clip 30 provided on the temperature detection device 1. As a result, the temperature detection device 1 is assembled to the coil 8.

In the present specification, a direction in which the extending part 8A of the coil 8 and the temperature sensor 10 are sandwiched by the temperature detection device 1 is referred to as a sandwiching direction D1. The sandwiching direction D1 corresponds to a thickness direction of the extending part 8A. A longitudinal direction of the extending part 8A is referred to as an extending direction D2, and a direction orthogonal to both of the sandwiching direction D1 and the extending direction D2 is referred to as an assembling direction D3. The sandwiching direction D1 and the extending direction D2 are preferably orthogonal to each other in order to uniformize pressing force applied from the clip 30 described below to the temperature sensor 10 in a case where the temperature sensor 10 is sandwiched and pressed by the clip 30.

In the present embodiment, the temperature detection device 1 is assembled by inserting the coil 8 into the temperature detection device 1 from the above-described assembling direction D3.

The temperature detection device 1 may be provided as an assembly previously assembled to the coil element including the extending part 8A. In this case, the coil element of the assembly can be assembled to the other part of the coil 8 at a providing destination.

Temperature detection devices 2 to 5 respectively according to second to fifth embodiments are also assembled in a similar manner.

[Configuration of Temperature Detection Device]

The temperature detection device 1 is mainly characterized in that the clip 30 is movable between predetermined positions of the holder 20. The clip 30 is attached to the holder 20 so as to be movable between a position of the clip 30 illustrated by a solid line in FIG. 1 (position where clip 30 is attached to holder 20 when clip 30 sandwiches the coil 8 through at least positioning portion 23A of holder 20, hereinafter, this position of clip 30 is referred to as attachment position) and a position illustrated by an alternate long and short dash line in FIG. 1 (position where clip 30 is separated from temperature sensor 10 held by holder 20, hereinafter, this position of clip 30 is referred to as separated position), along the assembling direction D3.

After the coil 8 is inserted into the temperature detection device 1 while the clip 30 is separated from the temperature sensor 10, the clip 30 is moved in a direction of a void arrow in FIG. 1 along the assembling direction D3, and the temperature sensor 10 and the coil 8 are sandwiched by the clip 30 through the positioning portion 23A of the holder 20 and a vicinity thereof.

Further, the temperature detection device 1 is characterized in that the coil 8 can be positioned with respect to the temperature sensor 10 by the holder 20 while the clip 30 is moved to the separated position.

A configuration of the temperature detection device 1 is described below.

Figure 2A:
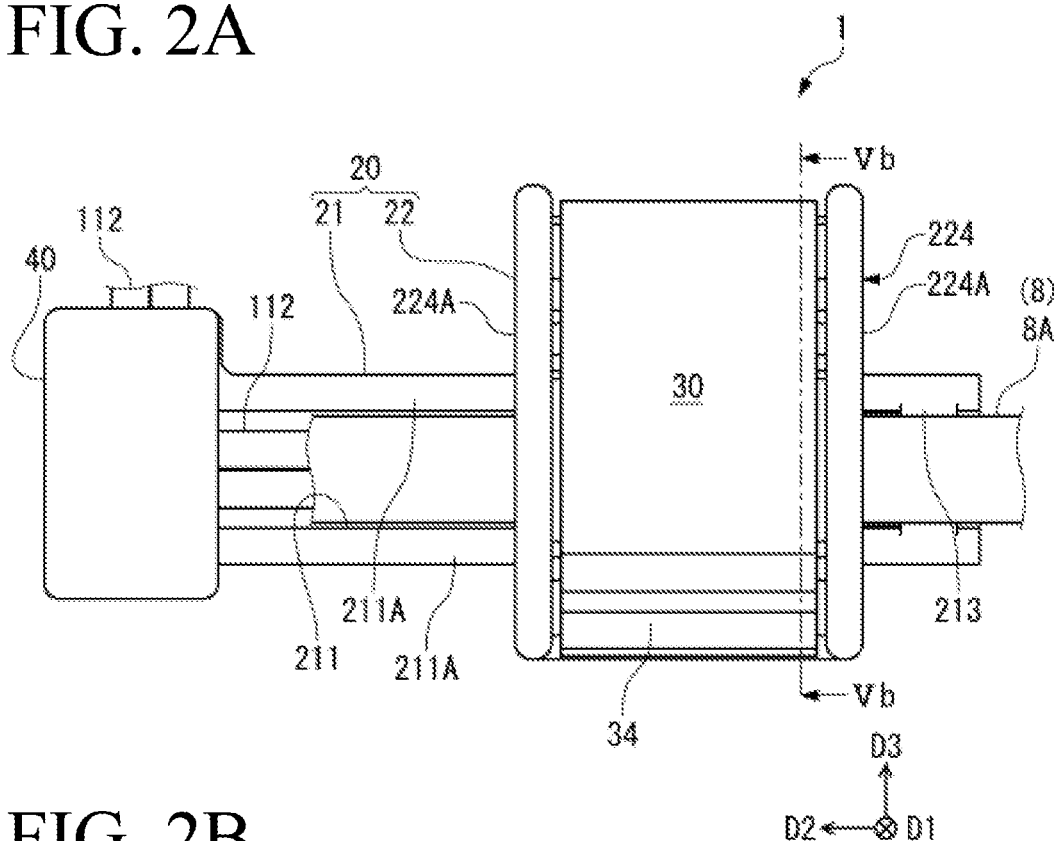
FIG. 2A is a side view illustrating the temperature detection device from a direction of an arrow IIa of FIG. 1.
Figure 2B:
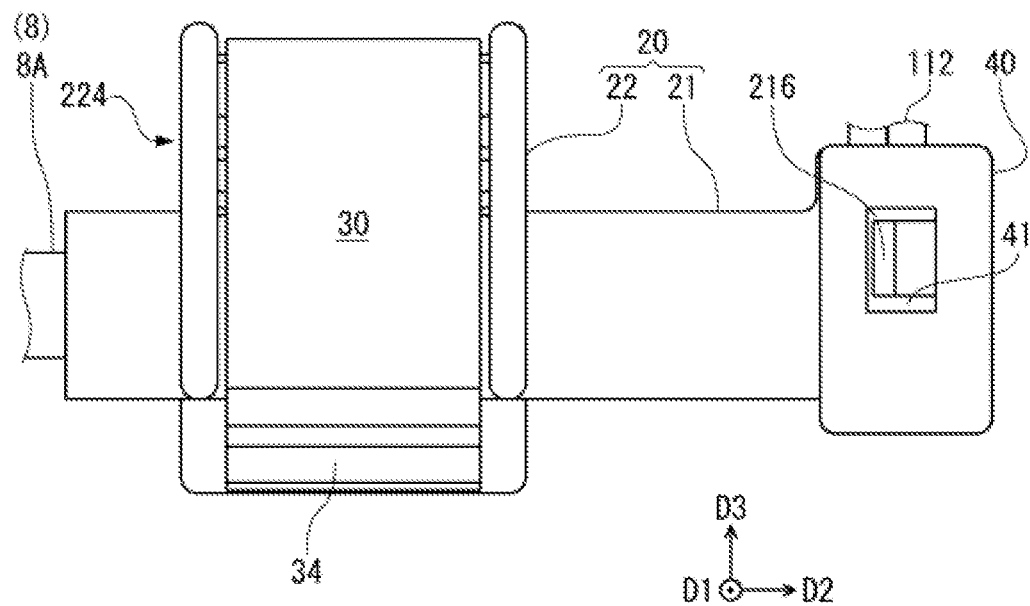
FIG. 2B is a side view illustrating the temperature detection device from a direction of an arrow IIb of FIG. 1.
Figure 3:
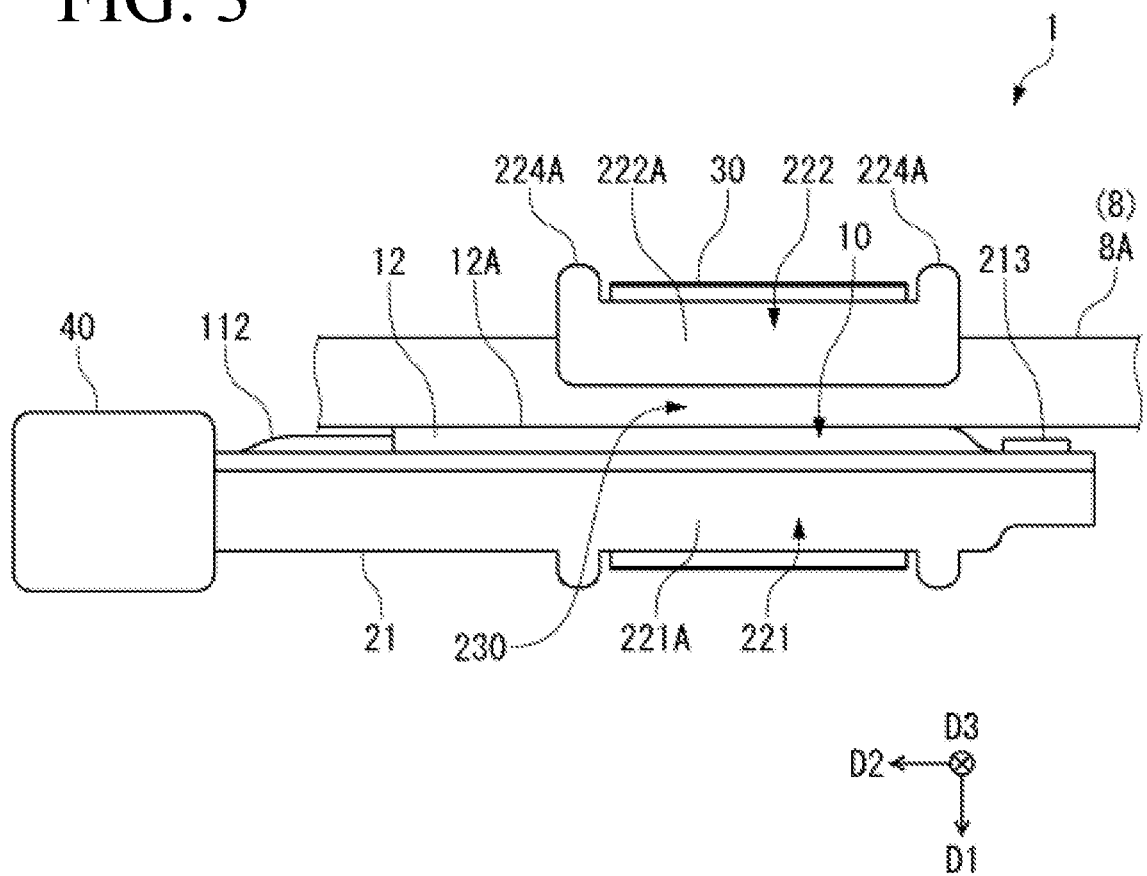
FIG. 3 is a plan view illustrating the temperature detection device from a direction of an arrow III of FIG. 1.

As illustrated in FIG. 1 to FIG. 3, the temperature detection device 1 includes the temperature sensor 10, the holder 20 holding the temperature sensor 10, the clip 30 that is an elastic body sandwiching the temperature sensor 10 and the coil 8, and a wire holding portion 40.

(Temperature Sensor)

Figure 4:
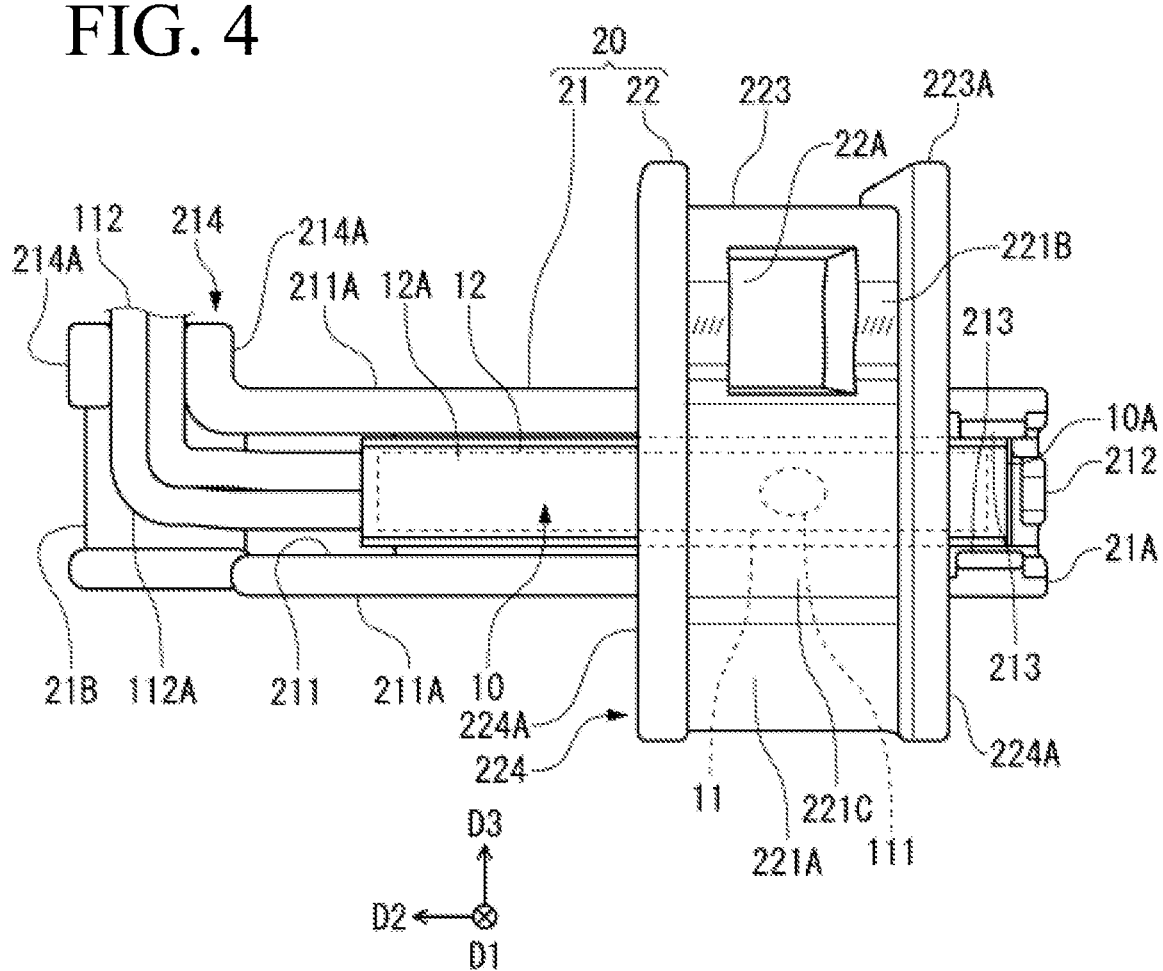
FIG. 4 is a diagram illustrating a temperature sensor and a holder from a direction of an arrow IV of FIG. 1.

As illustrated in FIG. 3 and FIG. 4, the temperature sensor 10 includes a thermosensitive element 11 that detects temperature, and a cover 12 that covers the thermosensitive element 11.

The temperature sensor 10 is assembled to the holder 20 so as to face the extending part 8A of the coil 8.

The thermosensitive element 11 includes a body portion 111 (FIG. 4) and paired electric wires 112. The body portion 111 is formed by sealing, with glass, a thermosensitive body (not illustrated) that can detect temperature based on variation of electric resistance to temperature variation. The paired electric wires 112 each have one end that is electrically connected to the thermosensitive body of the body portion 111, and are led from the body portion 111.

As the thermosensitive body used in the thermosensitive element 11, a resistor having a desired temperature coefficient is widely usable.

The paired electric wires 112 are led from the body portion 111 in the same direction, and each have the other end that is connected to an unillustrated circuit substrate. Each of the electric wires 112 includes an electroconductive core wire (not illustrated) to be connected to the thermosensitive body, and an insulating coating 112A that coats the core wire within at least a range exposed from the cover 12.

The cover 12 is provided over the whole of the body portion 111 and a part of the electric wires 112 that includes a part where the core wires of the electric wires 112 penetrate through the body portion 111.

The cover 12 is made of an appropriate resin material. The cover 12 protects the body portion 111 and a connection part of the body portion 111 and the electric wires 112 from external force such as impact. Further, the cover 12 contributes to insulation between the thermosensitive element 11 and the coil 8.

As illustrated in FIG. 4 and FIG. 5A, the cover 12 according to the present embodiment is formed to have a substantially rectangular-parallelepiped outer shape. As illustrated in FIG. 3, the cover 12 includes a flat contact surface 12A that comes into contact with the coil 8.

The temperature sensor 10 can be manufactured by, for example, disposing the thermosensitive element 11 in a mold and molding the cover 12 through injection molding.

The temperature sensor 10 according to the present embodiment has an elongated shape along the extending part 8A of the coil 8.

The shape of the temperature sensor 10 is not limited to the present embodiment, and can be appropriately formed. For example, the cover 12 may include a contact surface that is curved in a convex shape toward the coil 8.

(Holder)

As illustrated in FIGS. 2A and 2B and FIGS. 5A and 5B, the holder 20 holds the temperature sensor 10 and positions the coil 8 with respect to the temperature sensor 10.

As illustrated in FIG. 5C, the holder 20 according to the present embodiment accommodates the extending part 8A of the coil 8 in a concave portion 23 while the clip 30 is moved to the separated position, thereby positioning the coil 8 with respect to the temperature sensor 10.

The holder 20 is integrally formed of an appropriate insulating resin material through injection molding.

In the present embodiment, the holder 20 is interposed between the clip 30 made of the metal material and both of the temperature sensor 10 and the coil 8. The holder 20 secures insulation between the clip 30 and the temperature sensor 10 and insulation between the clip 30 and the coil 8.

An appropriate resin material can be used for the holder 20 irrespective of a thermoplastic resin and a thermosetting resin. Examples of the thermoplastic resin usable for the holder 20 include polyethylene, polypropylene, polyamidimide, polyimide, polyketone, polyether ether ketone, polyphenylene sulfide, polyphthalamide, polyetherimide, polyphenylsulfone, polysulfone, and polyethersulfone.

An appropriate resin material can be used depending on rigidity, strength, heat resistance, and the like required for the holder 20 in use of the temperature detection device 1. To secure required rigidity and strength, a fiber-reinforced resin material containing reinforcing fibers such as glass fibers can be used for the holder 20.

The above-described thermoplastic resin material and the thermosetting resin material can be used for the cover 12 of the temperature sensor 10 and the wire holding portion 40.

As illustrated in FIG. 4 and FIGS. 5A and 5B, the holder 20 includes a sensor holding portion 21 that holds the temperature sensor 10, and a holder body portion 22. The holder body portion 22 is externally provided with the clip 30, and has a function of positioning the extending part 8A of the coil 8 and the temperature sensor 10 in the inside. Further, the concave portion 23 (FIG. 5B) into which the extending part 8A and the temperature sensor 10 are inserted is provided inside the holder body portion 22. In the present embodiment, the extending part 8A and the temperature sensor 10 are sandwiched not only by the clip 30 but also by the holder body portion 22.

As illustrated in FIG. 1 and FIG. 4, the sensor holding portion 21 extends from a one end part 21A to the other end part 21B along the extending direction D2 and the extending part 8A of the coil 8.

The sensor holding portion 21 holds the temperature sensor 10. The sensor holding portion 21 includes a groove 211 that is opened toward one side in the sandwiching direction D1. The groove 211 is provided between walls 211A and 211A (FIG. 4) facing in the assembling direction D3. When the temperature sensor 10 is disposed in the groove 211 along the extending direction D2, the body portion 111 of the thermosensitive element 11 is disposed at a position of the holder body portion 22. The holder body portion 22 is located on the one end part 21A side of the sensor holding portion 21. The temperature sensor 10 and the coil 8 are sandwiched at a position corresponding to the body portion 111 by the clip 30 from the outside of the holder body portion 22.

A stopper 212 and pared holding pieces 213 are provided at the one end part 21A of the sensor holding portion 21 in the extending direction D2. One of front end parts 10A of the temperature sensor 10 in the extending direction D2 abuts on the stopper 212. The paired holding pieces 213 sandwich and hold the front end part 10A from both sides in the assembling direction D3.

A direction changing portion 214 is provided at the other end part 21B of the sensor holding portion 21 in the extending direction D2. The direction changing portion 214 includes walls 214A and 214A that guide the electric wires 112 in the assembling direction D3. The direction changing portion 214 changes the extending direction of the electric wires 112 from the extending direction D2 to the assembling direction D3.

The temperature sensor 10 is positioned in the extending direction D2 by the stopper 212 and the direction changing portion 214.

The direction changing portion 214 is not necessarily provided in the sensor holding portion 21. The electric wires 112 may be led from the other end part 21B of the sensor holding portion 21 in the extending direction D2. In this case, the electric wires 112 may be appropriately positioned with respect to the sensor holding portion 21.

As illustrated in FIG. 5B, the holder body portion 22 includes a first holder body portion 221, a second holder body portion 222, and a coupling portion 223. The first holder body portion 221 and the second holder body portion 222 sandwich the sensor holding portion 21 and the extending part 8A of the coil 8 from both sides in the sandwiching direction D1. The coupling portion 223 couples the first holder body portion 221 and the second holder body portion 222.

A hole 22A for weight reduction can be provided on the holder body portion 22 above (above in FIG. 4) the sensor holding portion 21.

As illustrated in FIG. 3 and FIG. 5B, an opening 230 of the concave portion 23 that accommodates the coil 8 and the temperature sensor 10 is provided on lower side of the holder body portion 22 in FIG. 1.

As illustrated in FIG. 5B, the concave portion 23 is defined inside a wall 231 that is an inside of the first holder body portion 221, a wall 232 that is an inside of the second holder body portion 222 and is also a bottom part of the groove 211 of the sensor holding portion 21, a wall 233 that couples these walls 231 and 232, and a wall 234 that is provided on the first holder body portion 221. The walls 231 and 232 are provided along the assembling direction D3, and the walls 233 and 234 are provided along the sandwiching direction D1. The walls 231 to 234 correspond to the positioning portion 23A that positions the coil 8 with respect to the temperature sensor 10.

In the present embodiment, a height (dimension in assembling direction D3) of the extending part 8A of the coil 8 and a height (dimension in assembling direction D3) of the temperature sensor 10 are equivalent to each other; however, these heights may be different from each other. A step may be provided on the wall 233 of the concave portion 23 depending on the height of the extending part 8A. The temperature sensor 10 and the extending part 8A may be positioned while being shifted to each other in the assembling direction D3 as long as the temperature sensor 10 can detect the temperature of the extending part 8A.

As illustrated in FIG. 5B, the first holder body portion 221 according to the present embodiment includes a projection piece 221A that projects below a lower end 222A of the second holder body portion 222. The projection piece 221A contributes to smooth insertion of the coil 8 into the concave portion 23. The projection piece 221A is provided so as to be inclined from a lower end of the first holder body portion 221 toward the outside in the sandwiching direction D1.

Figure 6A:
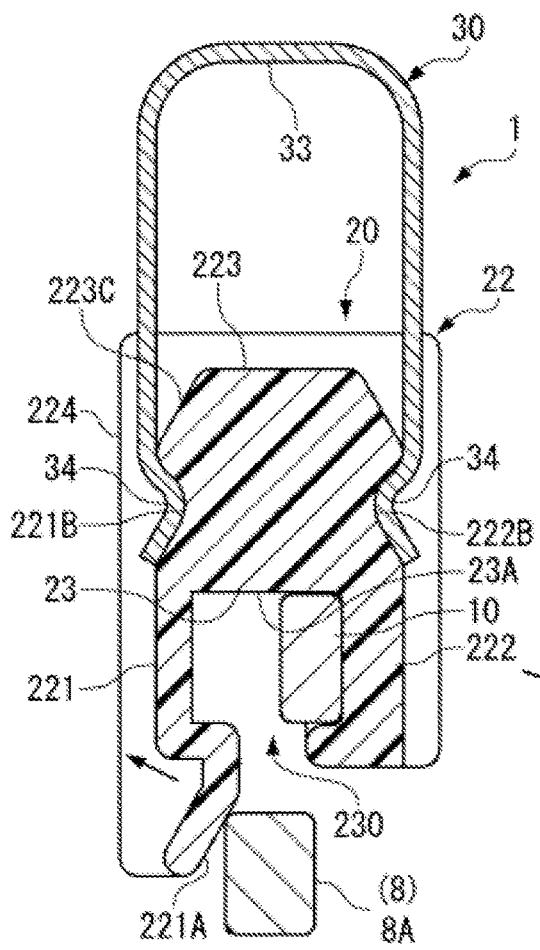
FIGS. 6A to 6C are diagrams illustrating a procedure of assembling the temperature detection device to a coil.

As illustrated in FIG. 6A, when the coil 8 abuts on the projection piece 221A while the clip 30 is moved to the separated position, the opening 230 is expanded by displacement and deformation of the projection piece 221A and the vicinity thereof (refer to arrow). When the extending part 8A of the coil 8 is inserted into the concave portion 23 through the opening 230, the coil 8 is sandwiched in a state of being positioned with respect to the temperature sensor 10 by the positioning portion 23A (FIG. 5B) that is an inner wall of the concave portion 23.

A dimension of the concave portion 23 between the walls 231 and 232 in the sandwiching direction D1 is set such that the temperature sensor 10 and the coil 8 come into contact with each other. The temperature sensor 10 can be retained in a state of being positioned at a desired position of the coil 8 by sandwiching of the temperature sensor 10 and the coil 8 by the holder body portion 22 and the clip 30 and friction between the temperature sensor 10 and the coil 8.

As illustrated in FIGS. 5B and 5C, the first holder body portion 221 and the second holder body portion 222 movably support the clip 30 in the assembling direction D3. The first holder body portion 221 and the second holder body portion 222 are provided with a guide 224 that guides the clip 30 in the assembling direction D3 to the separated position from the temperature sensor 10 where the coil 8 is positioned with respect to the temperature sensor 10 and the attachment position where the clip 30 sandwiches the temperature sensor 10 and the coil 8 as illustrated in FIG. 5B.

Paired guide walls 224A and 224A (FIG. 4) that configure the guide 224 are provided on respective sides of the first holder body portion 221 and the second holder body portion 222 in the extending direction D2. The paired guide walls 224A and 224A project at a distance corresponding to the width of the clip 30. The coupling portion 223 includes paired walls 223A and 223A that communicate with the respective guide walls 224A and 224A and accommodate a clip coupling portion 33. A support surface 223B (FIG. 5B) of the coupling portion 223 that supports the clip coupling portion 33 is formed flat.

As illustrated in FIG. 1, the clip 30 is wholly accommodated between paired walls 225 each configured of the guide wall 224A and the wall 223A in a plate shape as a whole. This makes it possible to prevent detachment of the clip 30 caused by contact of surrounding members with the clip 30 due to vibration or the like.

A separation locking portion 221B that locks the clip 30 at the separated position illustrated in FIG. 5B is provided on the first holder body portion 221.

A separation locking portion 222B that locks the clip 30 at the separated position illustrated in FIG. 5B with the separation locking portion 221B of the first holder body portion 221, is provided on the second holder body portion 222.

As illustrated in FIG. 4 and FIG. 5B, the separation locking portion 221B is a groove recessed from the support surface 221C of the first holder body portion 221 that supports the clip 30. When a locked portion 34 of the clip 30 is inserted into the separation locking portion 221B, the separation locking portion 221B locks the clip 30 at the separated position. Likewise, the separation locking portion 222B of the second holder body portion 222 is also a groove recessed from the support surface 222C, and locks the clip 30 at the separated position in a similar manner.

The separation locking portions 221B and 222B are formed so as to extend in the extending direction D2 and to be smoothly recessed. The locked portions 34 of the clip 30 are curved in shapes following the separation locking portions 221B and 222B. As illustrated in FIG. 5B, each of the separation locking portions 221B and 222B and each of the locked portions 34 has a substantially V-shaped cross-section.

The separation locking portions 221B and 222B communicate with the support surface 223B through respective inclined surfaces 223C that are provided on respective sides of the coupling portion 223 in the sandwiching direction D1.

(Wire Holding Portion)

The wire holding portion 40 (FIGS. 2A and 2B) holds the electric wires 112 to the sensor holding portion 21. The wire holding portion 40 has a box shape including two open surfaces so as to cover the direction changing portion 214 (FIG. 4) that is located at the end part 21B of the sensor holding portion 21. A top side and a right side of the wire holding portion 40 in FIG. 2A are opened. As illustrated in FIG. 2B, the wire holding portion 40 is assembled to the sensor holding portion 21 by inserting a locking projection 216 provided on rear surface side of the sensor holding portion 21, into a hole 41 provided on a wall of one surface of the wire holding portion 40.

The cover 12 of the temperature sensor 10 is held by the holder 20 by penetrating through the concave portion 23 of the holder body portion 22, and the electric wires 112 of the temperature sensor 10 are held to the holder 20 by the wire holding portion 40. This makes it possible to prevent the electric wires 112 from coming off from the holder 20 over the entire temperature sensor 10.

Note that, in a case where the sensor holding portion 21 is configured to prevent coming-off of the electric wires 112 or in a case where the temperature sensor 10 is wholly stably held by the clip 30 or the holder body portion 22 near a center of the temperature sensor 10 in a length direction, the wire holding portion 40 may not be provided on the sensor holding portion 21.

The temperature sensor 10, the holder 20, and the wire holding portion 40 can be assembled in the following manner.

First, as illustrated in FIG. 4, the temperature sensor 10 is inserted into the groove 211 from the other end part 21B side of the sensor holding portion 21, and the electric wires 112 are inserted between the walls 214A and 214A of the direction changing portion 214.

Next, the end part 21B of the sensor holding portion 21 is inserted into the wire holding portion 40 (FIGS. 2A and 2B), and the wire holding portion 40 is attached to the sensor holding portion 21 by the locking projection 216.

(Clip)

Next, as illustrated in FIG. 1 and FIG. 5B, the clip 30 sandwiches the temperature sensor 10 and the coil 8 that have been positioned by the holder body portion 22, from the outside through the holder body portion 22. The relative positional relationship of the clip 30 with the holder 20 is not fixed, and the clip 30 is movable with respect to the positioning portion 23A on which the temperature sensor 10 held by the holder 20, and the coil 8, the temperature of which is detected by the temperature sensor 10, are disposed.

The clip 30 according to the present embodiment is a plate spring that is formed by bending a plate member made of an appropriate metal material such as stainless steel, in a concave shape.

Note that the clip 30 is not limited to the plate member, and may be configured from a rod-shaped member or a linear member. The clip 30 may be formed of an appropriate material in an appropriate shape as long as the clip 30 can sandwich the temperature sensor 10 and the coil 8. A clip 80 (FIG. 12 and FIG. 14) and a clip 90 (FIG. 18) both described below are formed in a similar manner.

The clip 30 includes a first sandwiching portion 31, a second sandwiching portion 32, the clip coupling portion 33, and the locked portions 34. The first sandwiching portion 31 and the second sandwiching portion 32 sandwich the holder body portion 22 from both sides in the sandwiching direction D1. The clip coupling portion 33 couples the first sandwiching portion 31 and the second sandwiching portion 32. The locked portions 34 are locked to the separation locking portions 221B and 222B of the holder body portion 22.

The clip coupling portion 33 communicates with the first sandwiching portion 31 and the second sandwiching portion 32, and extends along the sandwiching direction D1.

The clip 30 has a substantially U-shaped cross-section including curved portions 35 on both sides in the holding direction D1, following the shape of the holder body portion 22 supporting the clip 30 (FIG. 5B).

The locked portions 34 are provided on respective ends of the clip 30.

The locked portions 34 are locked to the separation locking portions 221B and 222B of the holder body portion 22, which results in the temperature detection device 1 in which the clip 30 is integrated with the holder 20.

The clip 30 can be assembled to the holder 20 in the following manner.

The locked portions 34 of the clip 30 are placed on the respective inclined surfaces 223C (FIG. 5C) of the holder body portion 22, and the clip coupling portion 33 is pushed down in the assembling direction D3 toward the coupling portion 223 of the holder body portion 22. As a result, the clip 30 is elastically deformed by the inclined surfaces 223C such that the locked portions 34 are opened outward in the sandwiching direction D1. This makes it possible to smoothly lock the locked portions 34 to the separation locking portions 221B and 222B in the assembling direction D3 as illustrated in FIG. 5C. The clip 30 is locked between the paired guide walls 224A (FIG. 4) in the extending direction D2.

After the clip 30 is formed through bending processing and the holder 20 is molded through injection molding, the clip 30 is surely assembled to the holder 20 to complete the temperature detection device 1 only by one process to move the clip 30 toward the holder 20 as described above, without necessity of other processes. Accordingly, the temperature detection device 1 according to the present embodiment is suitable for mass production and is excellent in yield.

In a case where the temperature detection device 1 is provided in a state where the clip 30 is locked to the separation locking portions 221B and 222B of the holder 20, the provided temperature detection device 1 can be instantly assembled to the coil 8.

The temperature detection device 1, however, may be provided in a state where the clip 30 is locked to the attachment position.

Further, the temperature detection device 1 may be provided in a state where the clip 30 is separated from the holder 20. The clip 30 separated from the holder 20 is located at the separated position. In this case, the separation locking portions 221B and 222B are unnecessary.

Furthermore, the temperature detection device 1 may be provided in a state where the components of the temperature detection device 1, namely, the temperature sensor 10, the holder 20, the clip 30, and the wire holding portion 40 are separated into single components, and the components may be assembled to one another in the providing destination to acquire the temperature detection device 1. The holder 20 has a part to position the coil 8 with respect to the temperature sensor 10 and characteristics such as the separation locking portions 221B and 222B to lock the clip 30, and the like, even as a single component. Using the holder 20 having the characteristics and the clip 30 makes it possible to improve assembling workability of the temperature detection device 10 to the coil 8. The above description is true of a holder 50 according to a second embodiment, a holder 60 according to a third embodiment, and a holder 70 according to fourth and fifth embodiments.

[Method of Assembling Temperature Detection Device to Coil]

An example of a procedure of assembling the temperature detection device 1 to the coil 8 is described with reference to FIGS. 6A to 6C.

First, as illustrated in FIG. 6A, the coil 8 (extending part 8A) is inserted into the concave portion 23 inside the holder 20 through the opening 230 while the clip 30 provided on the holder 20 is separated from the temperature sensor 10 by the separation locking portions 221B and 222B.

At this time, if the clip 30 is located at a position (attachment position) corresponding to the temperature sensor 10, it is necessary to expand the projection piece 221A outward or to push the coil 8 into the concave portion 23 through the opening 230 against elastic force of the clip 30 that sandwiches the holder body portion 22 from both sides in the sandwiching direction D1, in order to insert the coil 8. The extending part 8A of the coil 8 is typically led from a region of the coil 8 supported by any member, and is not directly supported by a member. Accordingly, inserting the extending part 8A into the concave portion 23 up to a prescribed position facing the temperature sensor 10 while the clip 30 is expanded by the extending part 8A that is not fixed in position and may be moved, is inferior in assembling workability.

In contrast, according to the present embodiment, since the clip 30 is separated from the position (attachment position) corresponding to the temperature sensor 10, it is unnecessary to expand the clip 30. Since insertion of the coil 8 is not influenced by the elastic force of the clip 30, the coil 8 can be easily inserted into the concave portion 23 of the holder 20 by expanding the opening 230 with use of the projection piece 221A.

Figure 6B:
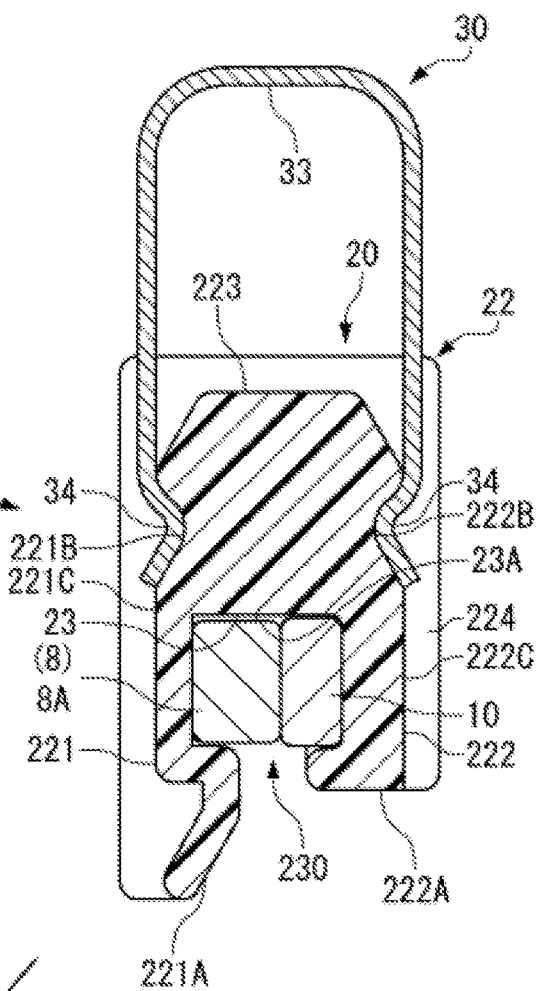

When the coil 8 is accommodated in the concave portion 23 as illustrated in FIG. 6B, the coil 8 is positioned with respect to the temperature sensor 10 by the positioning portion 23A that is the inner wall of the concave portion 23 of the holder body portion 22. As a result, the relative positions of the holder 20, the temperature sensor 10, and the coil 8 are determined. This state is referred to as a temporarily fixed state.

After the temporarily fixed state is first established, the clip 30 sandwiches the temperature sensor 10 and the coil 8 from the outside of the holder 20 through the positioning portion 23A of the holder 20 and the vicinity thereof.

To do so, the clip coupling portion 33 is pushed along the assembling direction D3 to move the clip 30 toward the attachment position while the clip 30 is guided by the guide 224. Then, the clip 30 is elastically deformed such that the locked portions 34 are opened toward both sides in the sandwiching direction D1, and the locked portions 34 accordingly come off from the separation locking portions 221B and 222B. Further, the locked portions 34 are slid on the support surfaces 221C and 222C while being guided by the guide 224.

Figure 6C:
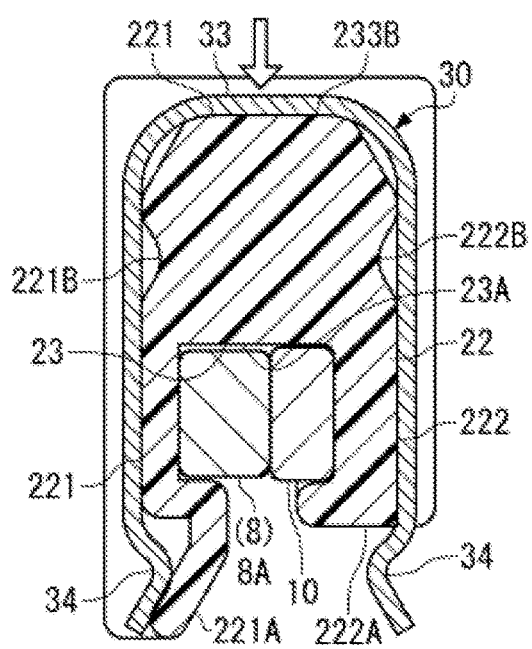

When the locked portions 34 are moved to positions beyond the lower ends of the first holder body portion 221 and the second holder body portion 222, the clip 30 is returned from the elastic deformation (FIG. 6C).

At this time, as illustrated in FIG. 6C, the clip 30 is locked to the holder body portion 22 while the temperature sensor 10 and the extending part 8A are positioned at the attachment position. Movement of the clip 30 to the separated position is also restricted. When the locked portions 34 are moved to the positions beyond the lower ends of the first holder body portion 221 and the second holder body portion 222, the clip coupling portion 33 abuts on the coupling portion 223 of the holder body portion 22. As a result, the whole of the holder body portion 22 is accommodated inside the clip 30, and the clip 30 is mated with the inside of the guide 224. Note that one locked portion 34 may abut on and be locked by the projection piece 221A of the first holder body portion 221.

The temperature detection device 1 is assembled to the coil 8 through the above-described procedure.

According to the present embodiment, the coil 8 is positioned by the positioning portion 23A on which the temperature sensor 10 and the coil 8 are disposed while the clip 30 is separated from the positioning portion 23A, and the clip 30 is then moved to the attachment position. This procedure makes it possible to easily assemble the temperature detection device 1 to the coil 8.

Accordingly, it is possible to improve assembling workability of the temperature detection device 1 to the coil 8.

To detach the temperature detection device 1 from the coil 8, the clip coupling portion 33 is pulled up in the assembling direction D3 to move the clip 30 to the separated position, and the coil 8 is then detached from the concave portion 23 of the holder 20. The work to detach the temperature detection device 1 from the coil 8 can be easily performed through such a procedure.

In the present embodiment, stress does not act on the clip 30 at least at the attachment position. When the temperature sensor 10 and the coil 8 are sandwiched by the clip 30, the coil 8 and the temperature sensor 10 accommodated in the concave portion 23 of the holder 20 are in contact with each other in an unloaded state, as with the positioning state (temporarily fixed state) where the clip 30 is located at the separated position. When the temperature sensor 10 and the coil 8 are sandwiched by the clip 30 and the holder 20, it is possible to bring the temperature sensor 10 into contact with the extending part 8A so as to sufficiently detect the temperature of the extending part 8A of the coil 8.

This makes it possible to contribute to reliability improvement of the temperature detection device 1 and the motor including the temperature detection device 1.

Unlike the present embodiment, the clip 30 may sandwich and press the temperature sensor 10 and the coil 8 with the elastic force. In this case, the temperature sensor 10 and the coil 8 may be pressed between the first holder body portion 221 and the second holder body portion 222 of the holder 20 that has been compressed and deformed by the elastic force of the clip 30, or may be in contact with each other in the unloaded state.

As another modification different from the present embodiment, locking portions (sandwiching locking portions) similar to the separation locking portions 221B and 222B that lock the clip 30 at the separated position may be provided on the holder body portion 22 in order to lock the clip 30 at the attachment position.

The configuration to lock the clip 30 to the separated position or the attachment position by the holder 20 is not limited to the configuration according to the present embodiment, and may be appropriately configured. For example, in place of the separation locking portions 221B and 222B respectively recessed from the support surfaces 221C and 222C, projections projected from the support surfaces 221C and 222C may be provided on the first and second holder body portions 221 and 222, and concave portions, grooves, holes, or the like corresponding to the projections may be provided on the clip 30.

The clip 30 is not limited to the clip according to the present embodiment, and may be formed with use of a resin material. In this case, even when the part of the holder 20 is not interposed between the clip 30 and both of the temperature sensor 10 and the coil 8, it is possible to secure insulation with the temperature sensor 10 and insulation with the coil 8.

In a case where the clip 30 is made of an insulating material such as a resin, the clip 30 and the coil 8 may be in contact with each other. In this case, for example, if the wall 231 of the concave portion 23 is not provided and the concave portion 23 is opened toward left side in FIG. 5B, the coil 8 can be inserted into the concave portion 23 from the left opening and positioned. Thereafter, the clip 30 can be moved to the attachment position, and can sandwich the coil 8 and the temperature sensor 10 through the wall 232 of the holder 20 and the vicinity thereof.

Second Embodiment

Next, a second embodiment of the present invention is described with reference to FIG. 7 and FIG. 8.

In the following description, matters different from the first embodiment are mainly described. Components similar to the components of the first embodiment are denoted by the same reference numerals.

As illustrated in FIGS. 7A to 7C, a temperature detection device 2 according to the second embodiment includes the temperature sensor 10, the holder 50 holding the temperature sensor 10, the clip 30 that sandwiches the temperature sensor 10 and the extending part 8A of the coil 8 positioned by the holder 50, and the wire holding portion 40.

As illustrated in FIGS. 7B and 7C and FIGS. 8A and 8B, the holder 50 includes a first holder 51 that is positioned on one side in the sandwiching direction D1, and a second holder 52 that is positioned on the other side and holds the temperature sensor 10. The first holder 51 and the second holder 52 can be formed with use of an appropriate resin material similar to the material of the holder 20 according to the first embodiment, through injection molding.

In the present embodiment, a portion corresponding to the holder body portion 22 of the holder 20 according to the first embodiment is divided into the first holder 51 and the second holder 52.

The second holder 52 includes the sensor holding portion 21 that holds the temperature sensor 10 as with the holder 20 according to the first embodiment.

The first holder 51 includes the separation locking portion 221B that locks the clip 30 at the separated position, and the second holder 52 similarly includes the separation locking portion 222B.

As illustrated in FIGS. 8A and 8B, the temperature detection device 2 according to the second embodiment is mainly characterized in that the first holder 51 and the second holder 52 are relatively rotatable around a shaft 53A (hereinafter, hinge shaft 53A) of a hinge 53.

In a state where the clip 30 is separated from the temperature sensor 10 held by the second holder 52, the first holder 51 and the second holder 52 are relatively rotated to open a gap between an end part 511 of the first holder 51 and an end part 521 of the second holder 52 that are separated from the hinge shaft 53A (FIG. 7B and FIG. 8B). Further, the coil 8 can be inserted into the gap between the end parts 511 and 521.

The hinge 53 is preferably provided integrally with any one of the first holder 51 and the second holder 52. In the present embodiment, the case where the hinge 53 is provided integrally with the first holder 51 is illustrated. Note that, in the following description, the hinge 53 indicates the hinge shaft 53A that is inserted halfway into a groove 522 provided on the second holder 52 along the extending direction D2 (portion appeared in semi-circular shape in FIGS. 8A and 8B), and a vicinity of the hinge shaft 53A.

The hinge shaft 53A is located near the separation locking portions 221B and 222B that lock the clip 30 at the separated position. Therefore, in the state where the clip 30 is moved to the separated position, the first holder 51 and the second holder 52 can be assembled with use of the clip 30 so as to be relatively rotatable around the hinge shaft 53A. This eliminates necessity of providing a pin or the like that rotatably supports the first holder 51 and the second holder 52.

To assemble the temperature detection device 2 according to the second embodiment to the coil 8, the extending part 8A of the coil 8 is inserted into the gap between the end part 511 of the first holder 51 and the end part 521 of the second holder 52 while the clip 30 is moved to the separated position as illustrated in FIG. 8A. At this time, the coil 8 abuts on the projection piece 221A provided on the first holder 51 to rotate the first holder 51 in a clockwise direction in FIG. 8A to an inclined state with respect to the second holder 52.

The coil 8 passing through the gap between the end part 511 and the end part 521 thus expanded abuts on a positioning portion 523A that is a wall of a concave portion 523 and the temperature sensor 10. The temperature sensor 10 held by the second holder 52, and the coil 8 are positioned as illustrated in FIG. 8A, in the above-described manner.

In the first embodiment, a path for insertion of the coil 8 is secured by elastically deforming a part (projection piece 221A and vicinity thereof) of the holder body portion 22. In contrast, in the second embodiment, a sufficient gap 54 for insertion of the coil 8 can be secured between the end part 511 and the end part 521 that are displaced in an expanding direction due to relative rotation of the first holder 51 and the second holder 52. Accordingly, the coil 8 can be surely inserted into the first holder 51 and the second holder 52 and can be positioned without elastic deformation of the first holder 51 and the second holder 52.

Next, the clip 30 is pushed down in a direction of a void arrow illustrated in FIG. 8A, and is moved to the attachment position along the guide 224. Then, the first holder 51 is pushed toward the second holder 52 by the locked portions 34 of the clip 30 coming off from the separation locking portions 221B and 222B, which causes the first holder 51 to rotate around the hinge shaft 53A in a counterclockwise direction. When the clip 30 is pushed down to the attachment position, the temperature sensor 10 and the coil 8 are sandwiched between the first holder 51 and the second holder 52 in which the end parts 511 and 521 are close to each other as illustrated in FIG. 8B, and the temperature sensor 10 and the coil 8 are also sandwiched by the clip 30 through the first holder 51 and the second holder 52.

At this time, since the coil 8 is sandwiched between a step part 512 provided on the first holder 51 and a wall of the concave portion 523 of the second holder 52, the position of the coil 8 is fixed also in the assembling direction D3.

Third Embodiment

Figure 9A:
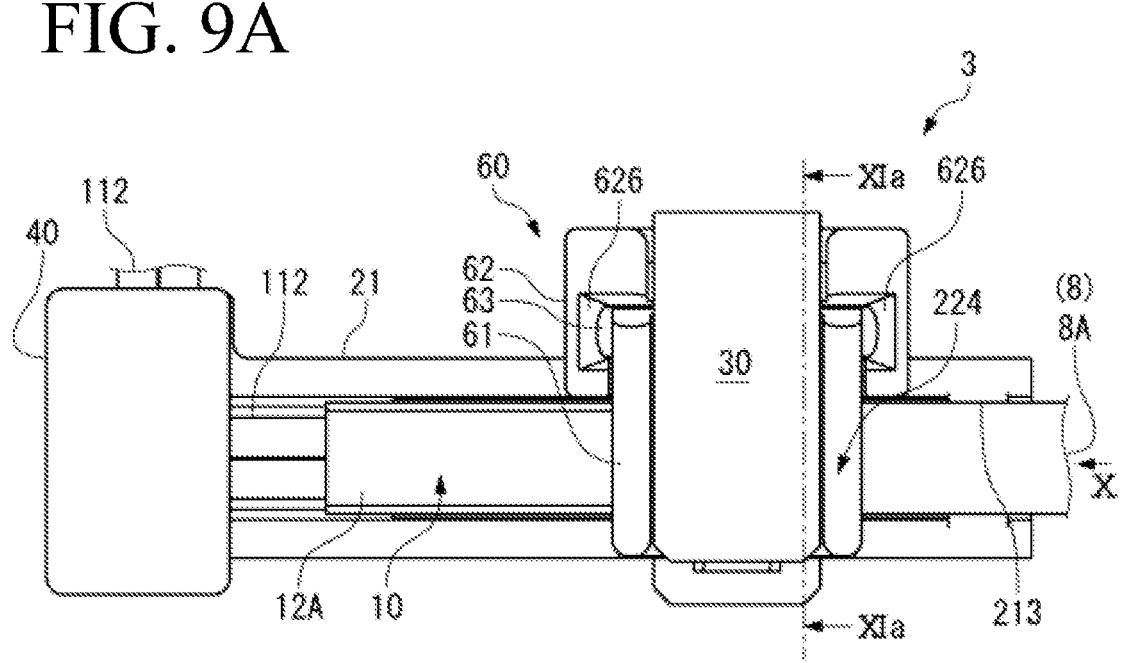
FIG. 9A is a side view illustrating a temperature detection device according to a third embodiment.

Next, a third embodiment of the present invention is described with reference to FIG. 9 to FIG. 11. Matters different from the first embodiment and the second embodiment described above are mainly described.

As illustrated in FIGS. 9A and 9B and FIGS. 10A and 10B, a temperature detection device 3 according to the third embodiment includes the temperature sensor 10, the holder 60 holding the temperature sensor 10, the clip 30 that sandwiches the temperature sensor 10 and the extending part 8A of the coil 8 positioned by the holder 60, and the wire holding portion 40.

As illustrated in FIGS. 10A and 10B and FIGS. 11A and 11B, the holder 60 includes a first holder 61 and a second holder 62 that holds the temperature sensor 10. The first holder 61 and the second holder 62 can be formed with use of an appropriate resin material similar to the material of the holder 20 according to the first embodiment, through injection molding.

The first holder 61 and the second holder 62 are relatively rotatable around a shaft 63A (hereinafter, hinge shaft 63A) of a hinge 63 that is provided integrally with the first holder 61. The hinge shaft 63A includes a rotation regulation portion 63B and has an asymmetric shape in a rotation direction.

The temperature detection device 3 according to the third embodiment is different from the temperature detection device 2 according to the second embodiment in that a latch arm 36 preventing coming-off of the clip 30 is provided, accidental relative rotation of the first holder 61 and the second holder is regulated, and the first holder 61 and the second holder 62 are assembled irrespective of the clip 30.

Figure 9B:
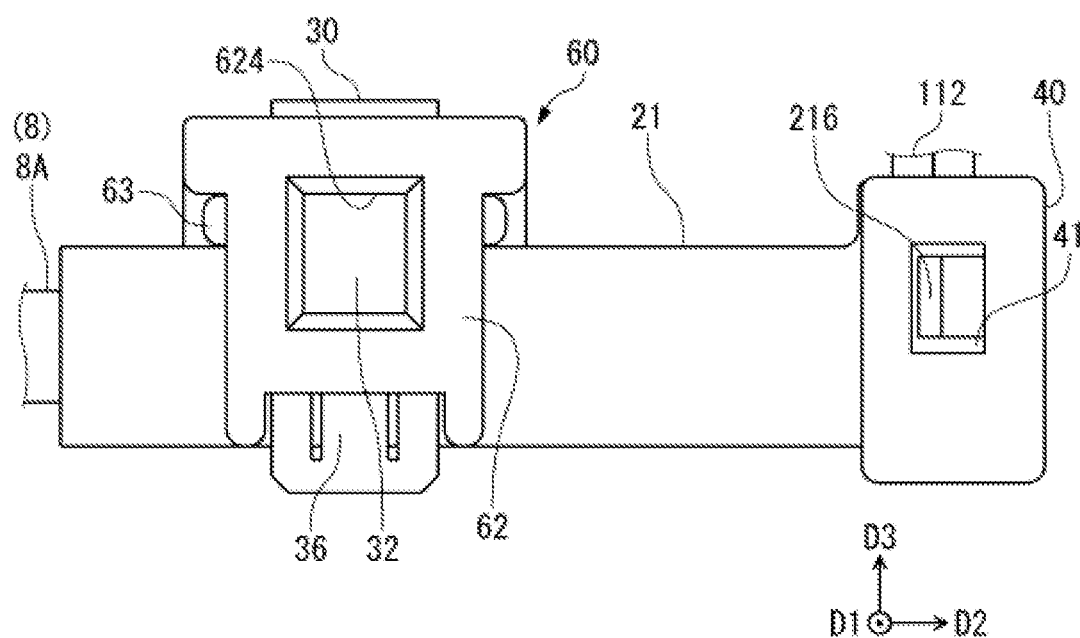
FIG. 9B is a side view illustrating the temperature detection device from rear surface side of FIG. 9A.

As illustrated in FIG. 9B and FIGS. 11A and 11B, the latch arm 36 has a cantilever shape that is formed by stamping the second sandwiching portion 32 of the clip 30 in a thickness direction and bending the stamped part outward in the sandwiching direction D1. A free end 361 of the latch arm 36 is located on the clip coupling portion 33 side relative to a support end 362.

When the clip 30 is located at the separated position, the latch arm 36 is locked to a separation locking portion 621 of the second holder 62 as illustrated in FIG. 11A. When the clip 30 is located at the attachment position, the latch arm 36 is locked to a sandwiching locking portion 622 of the second holder 62 as illustrated in FIG. 11B.

The second holder 62 includes a guide groove 623 into which the second sandwiching portion 32 including the latch arm 36 is inserted, and a hole 624 (FIG. 9B) on which the latch arm 36 is disposed.

In contrast to the present embodiment, the latch arm provided on the second holder may be locked to a locking portion provided on the clip 30.

In the present embodiment, the case where the first holder 61 and the second holder 62 are assembled through engagement between both end parts of the hinge shaft 63A and the second holder 62 irrespective of the clip 30 is illustrated and described.

The both end parts of the hinge shaft 63A in the extending direction D2 are inserted into engagement holes 625 (FIG. 10A) that are provided on respective sides of the second holder 62 in the extending direction D2. An inner peripheral part of each of the engagement holes 625 corresponds to engagement part with which the hinge shaft 63A engages.

The second holder 62 includes inclined surfaces 626 (FIG. 9A) on which the hinge shaft 63A is disposed in assembling of the first holder 61.

As illustrated in FIG. 11A, a part between the both end parts of the hinge shaft 63A is mated with a mating portion 627 provided on the second holder 62. The mating portion 627 is a groove or a concave portion that receives a part of the hinge shaft 63A.

The first holder 61 is preferably maintained in a state of being opened outward from the second holder 62, through mating of the hinge shaft 63A with the mating portion 627. This is because this facilitates insertion of the coil 8 into a gap between the first holder 61 and the second holder 62. Further, such a configuration makes it possible to maintain the state where the first holder 61 is opened outward during transportation of the temperature detection device 3.

In the present embodiment, in a state where the clip 30 is not assembled to the holder 60, the hinge shaft 63A that is provided on the first holder 61 in an attitude along the sandwiching direction D1 is disposed on the inclined surfaces 626, and the both end parts of the hinge shaft 63A are inserted into the respective engagement holes 625 of the second holder 62 while being guided by the inclined surfaces 626 as well as the hinge shaft 63A is inserted into the mating portion 627 from narrow-width side. Thereafter, first holder 61 is rotated in the counterclockwise direction in FIG. 11A to push the hinge shaft 63A into the mating portion 627. As a result, the rotation regulation portion 63B of the hinge shaft 63A is supported in a state of being pressed against an edge 627A of the mating portion 627. Accordingly, rotation of the first holder 61 in the counterclockwise direction in FIG. 11A is regulated, which makes it possible to maintain the first holder 61 in the opened state.

When an end part 311 of the clip 30 is disposed outside the first holder 61 as illustrated in FIG. 11A, rotation of the first holder 61 in a direction in which the first holder 61 is further opened outward is regulated by the clip 30.

After the first holder 61 and the second holder 62 are assembled by the hinge shaft 63A and the engagement holes 625, the clip 30 is assembled to the holder 60 while being guided by the guide 224 of the first holder 61 and the guide groove 623 of the second holder 62. When the latch arm 36 is inserted into the guide groove 623, the latch arm 36 is bent in the sandwiching direction D1 and is returned at the position of the hole 624. At this time, the latch arm 36 is locked to the separation locking portion 621 as illustrated in FIG. 11A. The clip 30 is locked to the separation locking portion 621 unless the latch arm 36 is broken. Therefore, the clip 30 is surely retained at the separated position without coming off from the holder 60.

In a state where the clip 30 is moved to the separated position and the first holder 61 is opened as illustrated in FIG. 11A, the coil 8 is inserted into the concave portion 628 provided in the second holder 62 from an opening on side of the concave portion 628 between the first holder 61 and the second holder 62. As a result, as illustrated in FIG. 11A, the coil 8 and the temperature sensor 10 are positioned by a positioning portion 628A that is an inner wall of the concave portion 628.

Thereafter, when the clip 30 is pushed down, the first holder 61 is pushed by the clip 30 to cause the rotation regulation portion 63B to run on the edge 627A of the mating portion 627, which closes the first holder 61 as illustrated in FIG. 11B. The latch arm 36 is also bent in the sandwiching direction D1 at this time, and is locked to the sandwiching locking portion 622 at a position coming off from the guide groove 623.

As a result, the temperature sensor 10 and the coil 8 are sandwiched by the clip 30 and the first holder 61 and the second holder 62, and the clip 30 is prevented from coming off from the holder 60. The temperature detection device 3 is accordingly surely fixed to the coil 8.

According to the third embodiment, even in the state where the clip 30 is separated from the holder 60, the first holder 61 and the second holder 62 can be assembled and integrated by the hinge shaft 63A.

Accordingly, this is suitable for the case where the temperature detection device 3 is provided in the state where the clip 30 is separated.

Further, in the third embodiment, the latch arm 36 is adopted and the separation locking portion 621 is disposed at a position overlapping with the concave portion 628 in the height direction (assembling direction D3). This makes it possible to suppress the height of the holder 60. The inclined surfaces 223C provided above the separation locking portions 221B and 222B in the first embodiment are unnecessary because the latch arm 36 is adopted. Therefore, a radius of curvature at an upper end of each of the holders 61 and 62 is small.

Accordingly, a radius of curvature of each of the curved portions 35 of the clip 30 is also small.

Fourth Embodiment

Next, a fourth embodiment of the present invention is described with reference to FIG. 12 to FIG. 17. Matters different from the first to third embodiments described above are mainly described.

As illustrated in FIG. 12 to FIG. 15, a temperature detection device 4 according to the fourth embodiment includes the temperature sensor 10 (FIG. 15), the holder 70 holding the temperature sensor 10, the clip 80 (elastic body) that sandwiches the temperature sensor 10 and the extending part 8A of the coil 8, a clip resin portion 85 (contact member) to be attached to the clip 80, and the wire holding portion 40.

The clip 80 according to the fourth embodiment is provided on the holder 70 so as to be movable between the attachment position (FIG. 12 to FIG. 14) where the clip 80 is attached to the holder 70 in order to sandwich the temperature sensor 10 and the coil 8, and the separated position (FIG. 15 and FIG. 16) where the clip 80 is separated from the temperature sensor 10, as with the clip 30 according to the first to the third embodiments.

In the fourth embodiment, it is characterized in that, when the clip 80 is located at the separated position (FIG. 15 and FIG. 16), an accommodation concave portion 720 (concave portion) provided in the holder 70 is opened on one side in the sandwiching direction D1, and when the clip 80 is moved to the attachment position, the clip 80 and an opening 724 of the accommodation concave portion 720 face each other.

This is true of a fifth embodiment described next. Unlike the second embodiment and the third embodiment, a member rotatable around a hinge shaft is not provided in the fourth embodiment and the fifth embodiment.

In the fourth embodiment, one (61) of the two holder portions (for example, refer to FIG. 11) in each of the second and third embodiments is assembled to the clip so as to be movable with the clip with respect to the other holder (62). The holder movable with the clip corresponds to the clip resin portion 85 attached to the clip 80 according to the fourth embodiment.

When the clip 80 is moved to the attachment position (FIG. 14), the clip resin portion 85 comes into contact with the coil 8 exposed from the opening 724 of the accommodation concave portion 720. At this time, the temperature sensor 10 and the coil 8 are held between the clip resin portion 85 and the holder 70.

(Holder)

As illustrated in FIG. 12 to FIG. 15, the holder 70 includes the sensor holding portion 21 extending in the extending direction D2, and a holder body portion 72 that is provided integrally with the sensor holding portion 21 and has a substantially rectangular-parallelepiped outer shape.

The temperature sensor 10 is held by the sensor holding portion 21. The clip 80 is attached to the holder body portion 72.

The sensor holding portion 21 and the holder body portion 72 are integrally formed through injection molding using an appropriate resin material.

The sensor holding portion 21 (FIG. 12 to FIG. 15) can include a configuration similar to the configuration of the sensor holding portion 21 (FIG. 4) according to the first embodiment. When the temperature sensor 10 is disposed in the groove 211 between the walls 211A and 211A (FIG. 15) provided on the sensor holding portion 21, the body portion 111 (FIG. 15) of the thermosensitive element 11 is disposed in the accommodation concave portion 720 of the holder body portion 72.

Figure 14:
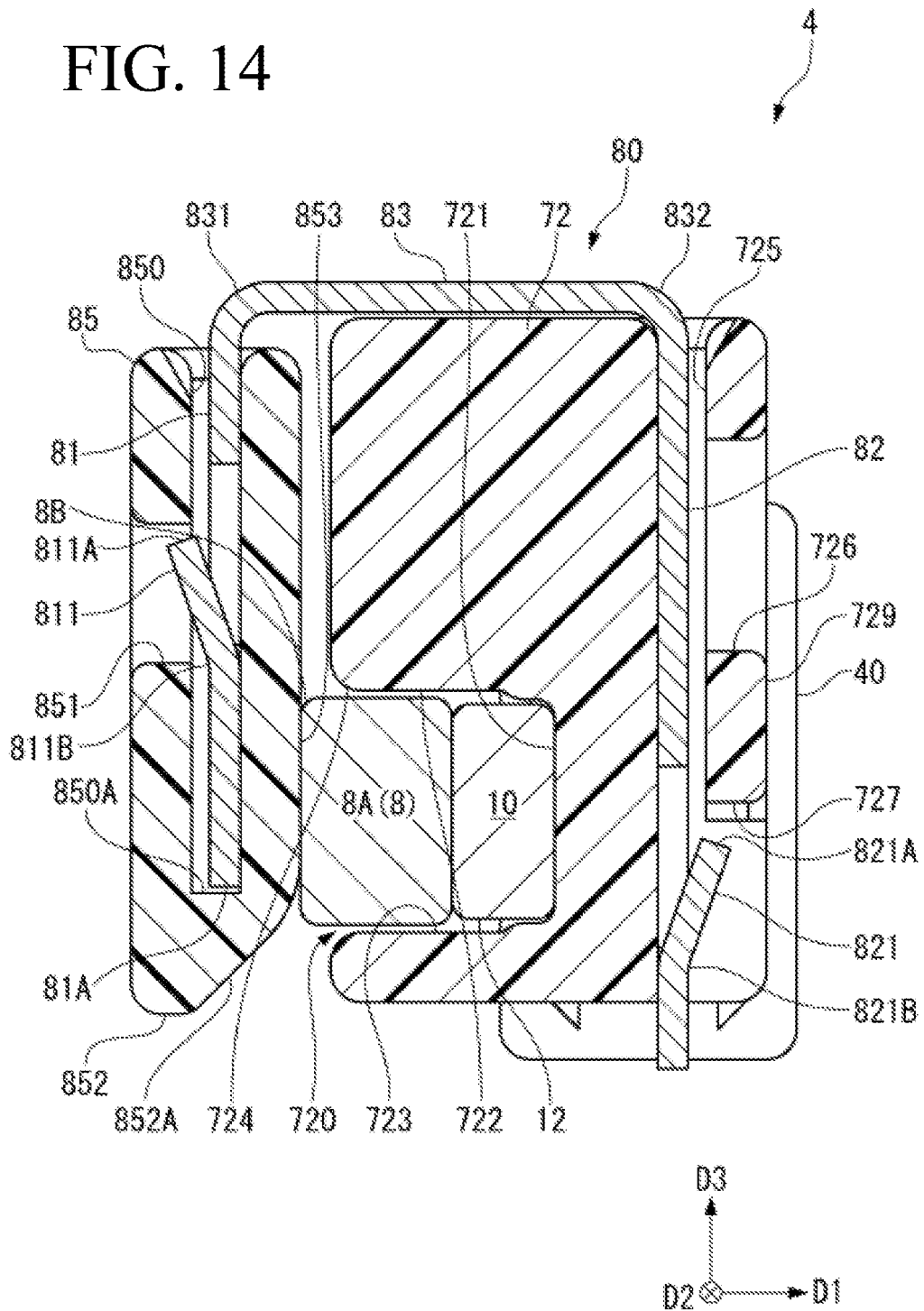
FIG. 14 is a cross-sectional view taken along a line XIV-XIV of FIG. 12.
Figure 15:
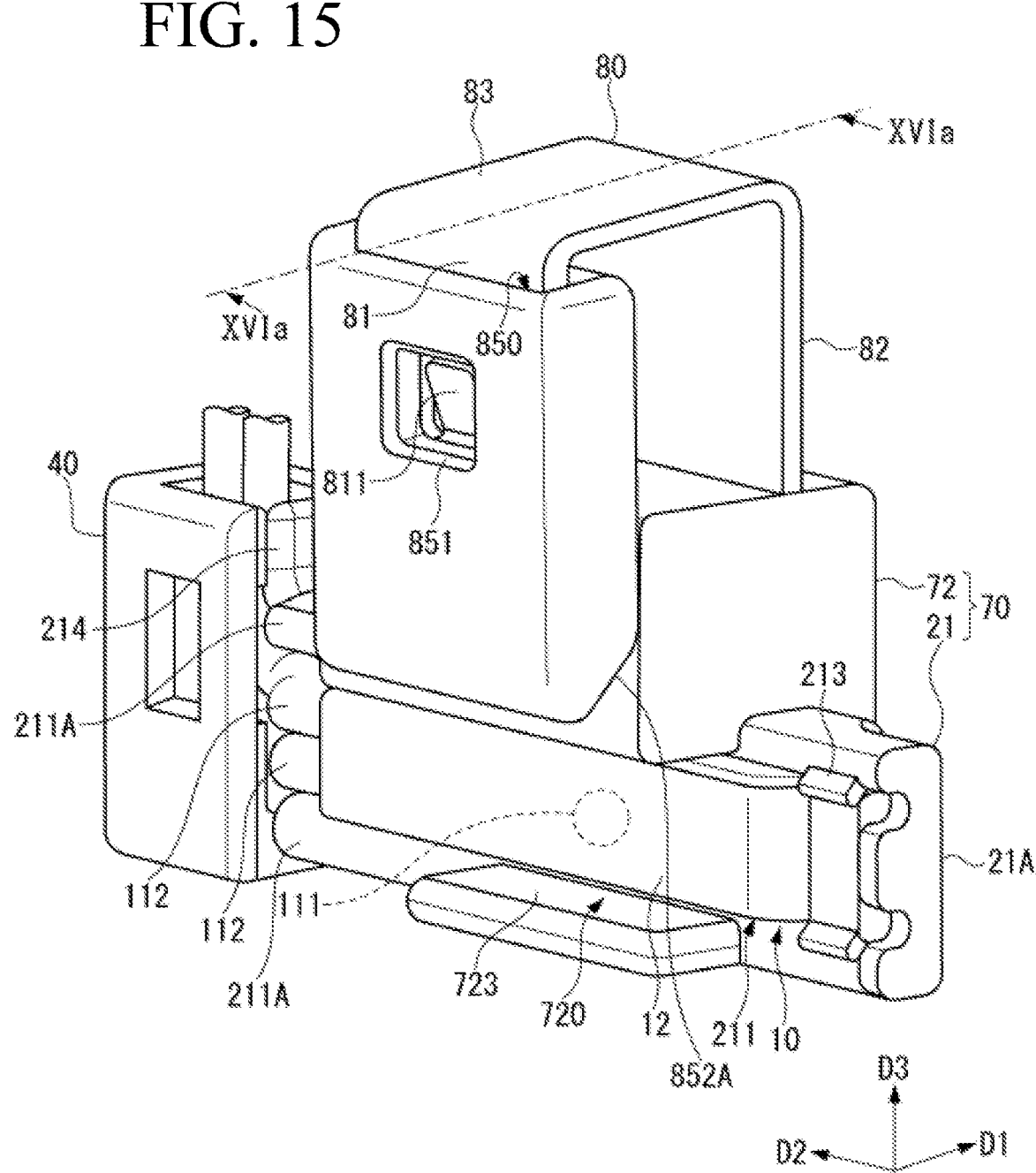
FIG. 15 is a perspective view illustrating the temperature detection device in a state where a clip (elastic body) is retreated.

As illustrated in FIG. 14, the holder body portion 72 includes the accommodation concave portion 720 that accommodates the temperature sensor 10 and the extending part 8A of the coil 8. The accommodation concave portion 720 has a substantially C-shaped cross-section in which one side in the sandwiching direction D1 is opened so as to follow the cover 12 of the temperature sensor 10 and the outer shape of the extending part 8A.

The accommodation concave portion 720 is defined inside a side wall 721, an upper wall 722, and a lower wall 723. The side wall 721 also serves as a bottom part of the groove 211 (FIG. 13B) between the walls 211A and 211A of the sensor holding portion 21, and rear surface side of the cover 12 of the temperature sensor 10 abuts on the side wall 721. The upper wall 722 communicates with one end of the side wall 721. The lower wall 723 communicates with the other end of the side wall 721.

The side wall 721 is provided along the assembling direction D3. The upper wall 722 and the lower wall 723 are provided substantially along the sandwiching direction D1. The accommodation concave portion 720 includes the opening 724 between the upper wall 722 and the lower wall 723.

A length of the upper wall 722 and a length of the lower wall 723 in the sandwiching direction D1 are substantially equal to each other; however, the lengths may be different from each other. For example, the length of the lower wall 723 may be smaller than the length of the upper wall 722.

The extending part 8A of the coil 8 is inserted into the accommodation concave portion 720 from the opening 724. An appropriate clearance is set between the upper wall 722 and the extending part 8A and between the lower wall 723 and the extending part 8A.

A dimension from the side wall 721 to the position of the opening 724 in the sandwiching direction D1 is set slightly smaller than a total dimension of the temperature sensor 10 and the coil 8 in the sandwiching direction D1. The reason for this is to cause the coil 8 to slightly project from the opening 724 of the accommodation concave portion 720 in order to surely bring a flat part 853 of the clip resin portion 85 attached to the clip 80 into contact with the coil 8 irrespective of dimensional tolerance of the temperature sensor 10 and the coil 8.

Figure 13A:
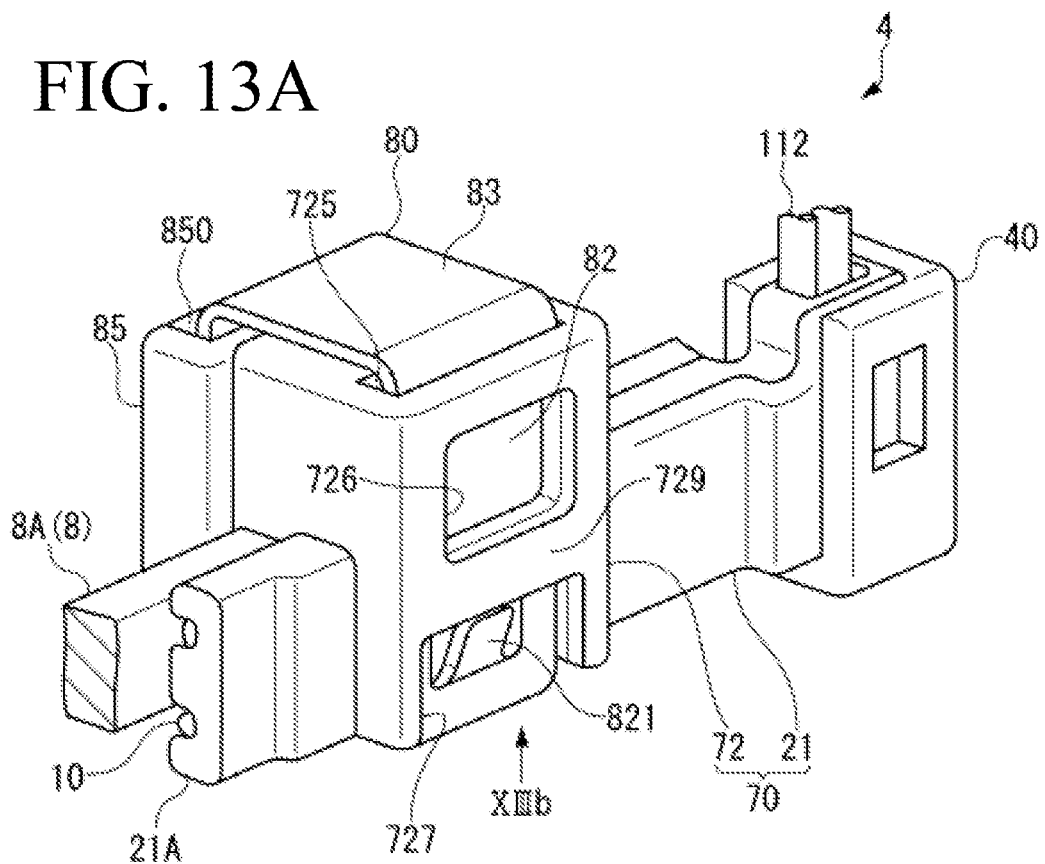
FIG. 13A is a perspective view illustrating the temperature detection device from a direction of an arrow XIIIa of FIG. 12.
Figure 13B:
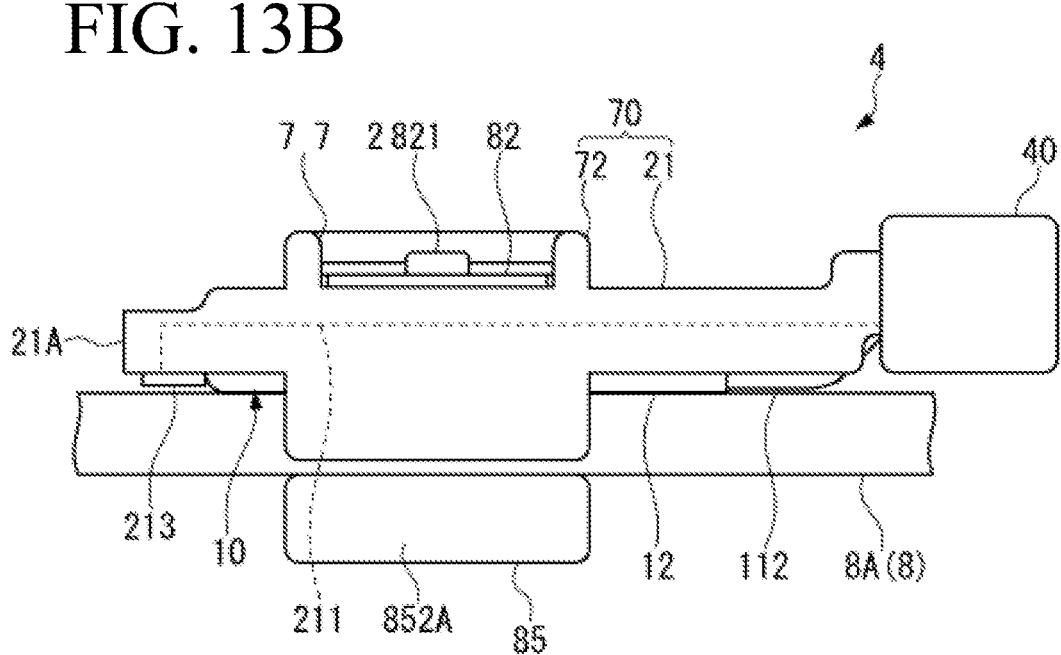
FIG. 13B is a bottom view illustrating the temperature detection device from a direction of an arrow XIIIb of FIG. 13A.

As illustrated in FIG. 14 and FIG. 13A, the holder body portion 72 includes a guide groove 725 that guides the clip 80 along the assembling direction D3. The clip 80 is locked to the holder body portion 72 at any of the separated position (FIG. 16) and the attachment position (FIG. 14) while being inserted into the guide groove 725.

An outer wall 729 (FIG. 14 and FIG. 13A) of the holder body portion 72 includes a locking hole 726 to lock the clip 80, and a locking notch 727.

(Clip)

The clip 80 is attached to the holder 70 so as to be movable between the separated position (FIG. 16) and the attachment position (FIG. 14) in the assembling direction D3, as with the clip 30 according to each of the above-described first to third embodiments. When the clip 80 is moved from the separated position to the attachment position, the clip 80 sandwiches the temperature sensor 10 and the coil 8 with elastic force.

The clip 80 according to the present embodiment is configured to close the opening 724 of the accommodation concave portion 720 by being moved from the separated position to the attachment position. In the present embodiment, the opening 724 is closed by the clip resin portion 85 provided on the clip 80.

The clip 80 is formed by bending a plate member made of an appropriate metal material in a concave shape, in a manner similar to the above-described clip 30. As illustrated in FIG. 14, the clip 80 has a substantially U-shaped cross-section.

As illustrated in FIG. 14, the clip 80 includes a first sandwiching portion 81, a second sandwiching portion 82, and a clip coupling portion 83. The first sandwiching portion 81 is disposed on one side in the sandwiching direction D1. The second sandwiching portion 82 is disposed on the other side in the sandwiching direction D1. The clip coupling portion 83 coupes the first sandwiching portion 81 and the second sandwiching portion 82 along the sandwiching direction D1. The clip coupling portion 83 and the first sandwiching portion 81 are continuously formed through a curved portion 831, and the clip coupling portion 83 and the second sandwiching portion 82 are continuously formed through a curved portion 832.

Figure 16:
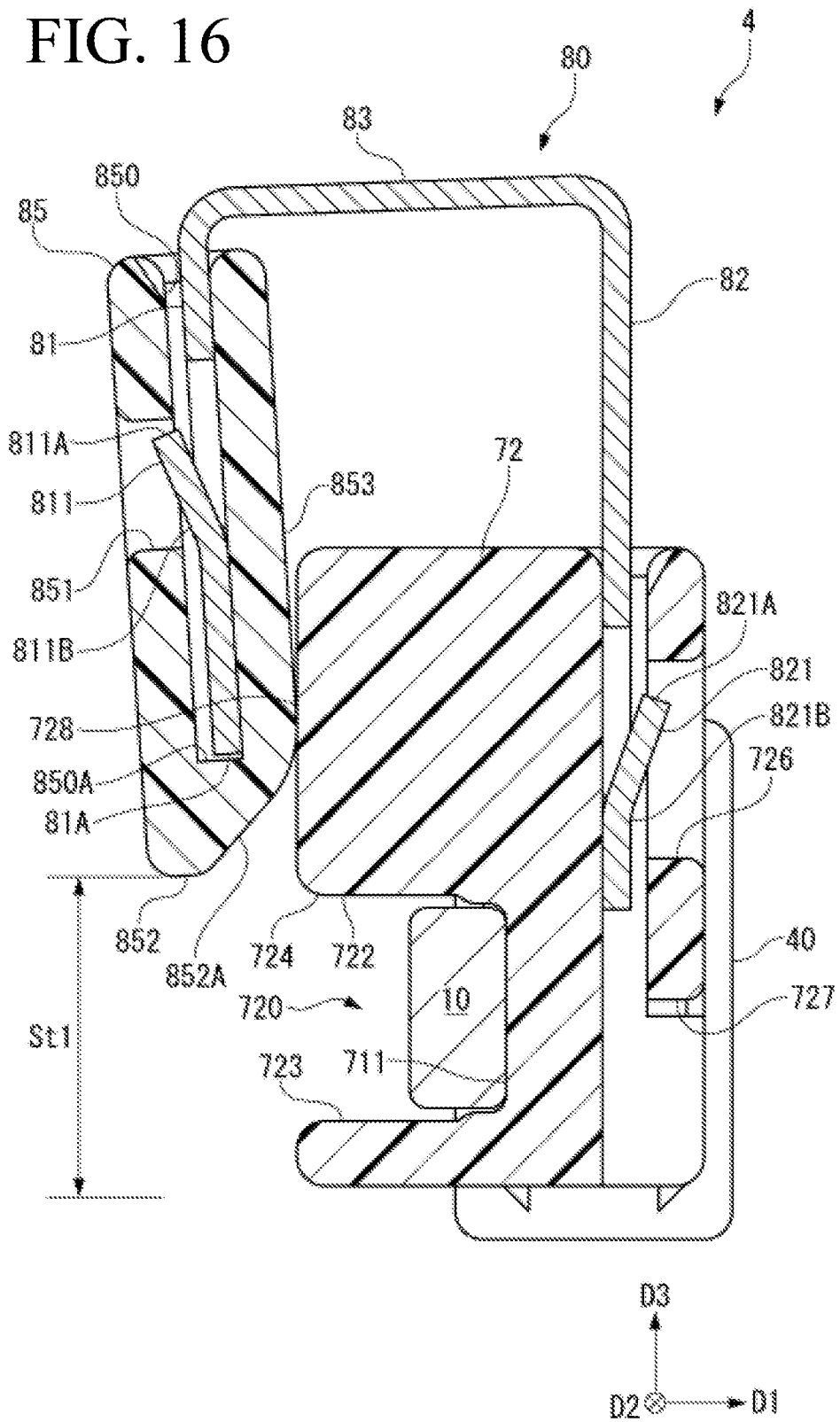
FIG. 16 is a cross-sectional view taken along a line XVIa-XVIa of FIG. 15.

FIG. 16 illustrates a state where the clip 80 is elastically deformed in a direction in which a gap between the first sandwiching portion 81 and the second sandwiching portion 82 is expanded. As illustrated in FIG. 16, when the clip 80 is located at the separated position, the first sandwiching portion 81 is slightly inclined with respect to the second sandwiching portion 82. Therefore, a distance on front end side between the first sandwiching portion 81 and the second sandwiching portion 82 is smaller than a dimension of the clip coupling portion 83 in the sandwiching direction D1. The distance becomes smaller when the clip 80 is in the unloaded state. At this time, the clip resin portion 85 is pressed against the holder body portion 72 by the elastic force of the clip 80 in the sandwiching direction D1. Accordingly, even when the clip 80 and the clip resin portion 85 are located at the separated position, it is possible to prevent the clip resin portion 85 from coming off from the holder body portion 72 by the elastic force of the clip 80.

The first sandwiching portion 81 includes a first latch arm 811 to lock the clip resin portion 85.

As illustrated in FIG. 14, the first latch arm 811 has a cantilever shape that is formed by stamping the first sandwiching portion 81 in a thickness direction and bending the stamped part outward in the sandwiching direction D1. A free end 811A of the first latch arm 811 is located on the clip coupling portion 83 side relative to a support end 811B.

In contrast to the present embodiment, the latch arm provided on the clip resin portion 85 may be locked to a locking portion provided on the clip 80. A second latch arm 821 described below is configured in a similar manner.

The second sandwiching portion 82 includes the second latch arm 821 to lock the clip 80 to the holder body portion 72 at the separated position and the attachment position.

The second latch arm 821 has a cantilever shape that is formed by stamping the second sandwiching portion 82 in a thickness direction and bending the stamped part toward side opposite to the first latch arm 811. A free end 821A of the second latch arm 821 is located on the clip coupling portion 83 side relative to a support end 821B, as with the first latch arm 811. Further, the second latch arm 821 is locked to the locking hole 726 of the holder body portion 72 when the clip 80 is located at the separated position, and the second latch arm 821 is locked to the locking notch 727 of the holder body portion 72 when the clip 80 is located at the attachment position. In other words, the clip 80 and the holder 70 are joined by the second latch arm 821. The second sandwiching portion 82 can be configured in a shape similar to the second sandwiching portion 32 of the clip 30 (FIG. 11) according to the third embodiment. The holder body portion 72 locking the second sandwiching portion 82 can be configured in a shape similar to the second holder 62 (FIG. 11) according to the third embodiment.

(Clip Resin Portion)

The clip resin portion 85 (FIG. 12 and FIG. 14) according to the present embodiment is manufactured with use of an appropriate insulating resin material similar to the holder 70 through, for example, injection molding. Further, the clip resin portion 85 and the clip 80 can be integrally formed through insertion injection molding that is performed while the clip 80 is disposed in a mold.

Figure 12:
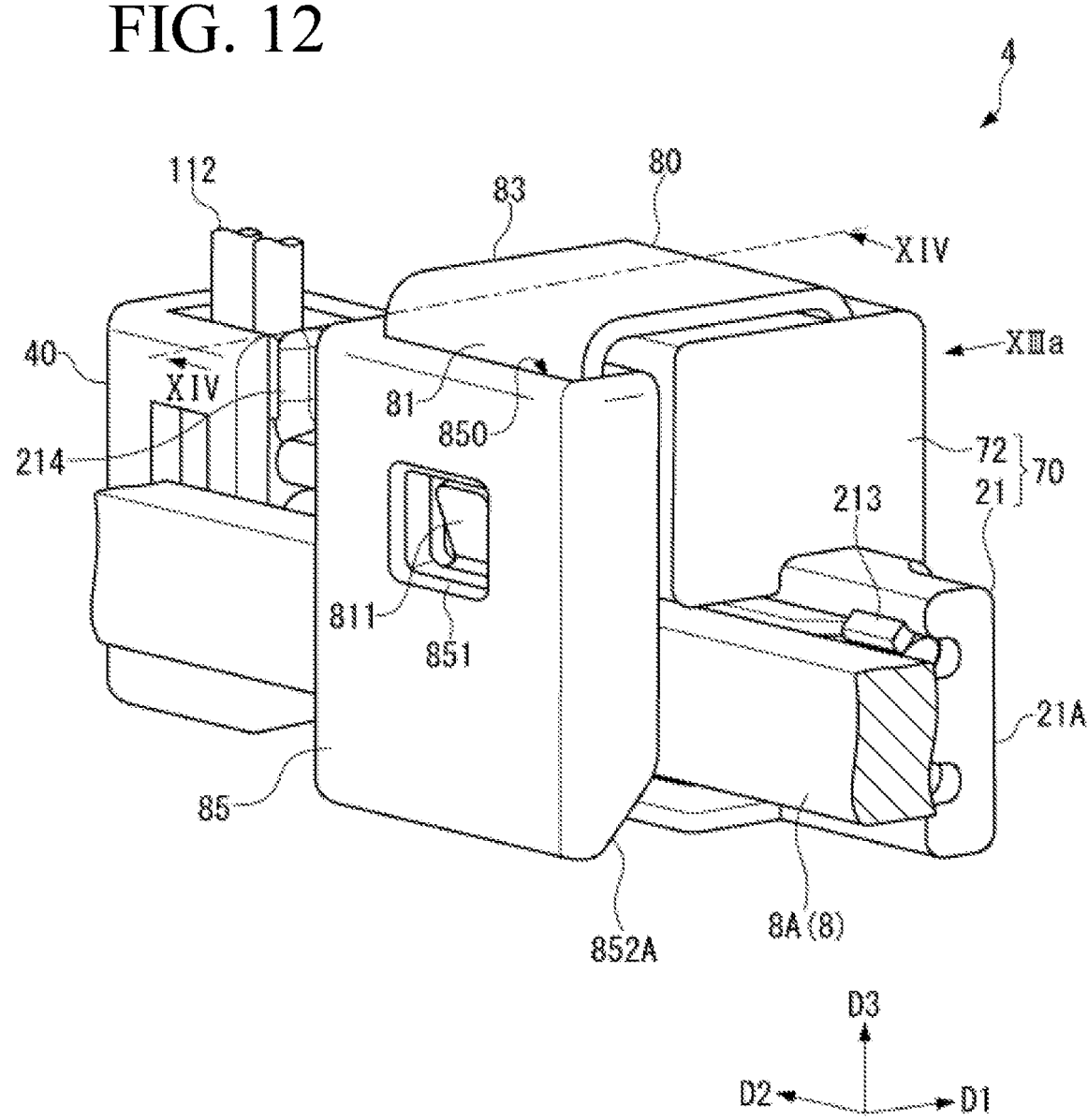
FIG. 12 is a perspective view illustrating a temperature detection device according to a fourth embodiment.

As illustrated in FIG. 12 and FIG. 14, the clip resin portion 85 includes an accommodation groove 850 and a locking hole 851. The accommodation groove 850 has a substantially plate-like outer shape, and accommodates the first sandwiching portion 81. The first latch arm 811 of the first sandwiching portion 81 is disposed in the locking hole 851.

The accommodation groove 850 of the clip resin portion 85 is provided so as to extend in the assembling direction D3. One side (upper side in FIG. 14) of the accommodation groove 850 in the assembling direction D3 is opened, and a terminal end 850A on the other side (lower side in FIG. 14) is closed. To attach the clip resin portion 85 to the first sandwiching portion 81 of the clip 80 without backlash, the accommodation groove 850 is formed, for example, in the shape substantially same as the shape of the first sandwiching portion 81.

As illustrated in FIG. 12, the locking hole 851 is a through hole communicating with the accommodation groove 850 in the sandwiching direction D1. The locking hole 851 is formed by cutting a part of the clip resin portion 85. Further, when the first sandwiching portion 81 is inserted from opening side of the accommodation groove 850, the clip resin portion 85 is attached to the first sandwiching portion 81 of the clip 80. When the first sandwiching portion 81 of the clip 80 is accommodated in the accommodation groove 850, the free end 811A of the first latch arm 811 is locked to the inside of the locking hole 851 of the clip resin portion 85, and the clip resin portion 85 is mounted on the first sandwiching portion 81 of the clip 80. As described above, the clip resin portion 85 is movable with the clip 80 by being mounted on the clip 80.

The locking hole 851 according to the present embodiment is formed as a through hole, which allows for visual confirmation of a state where the first latch arm 811 is locked to the clip resin portion 85 through the locking hole 851. Further, as compared with a case where the locking portion is formed as a not-through hole, it is possible to suppress the thickness of the first sandwiching portion 81 to prevent uncompleted restoration from the elastically-deformed state of the first latch arm 811, and to surely lock the first latch arm 811 to the clip resin portion 85.

Note that the locking portion is not limited to the through hole as long as the first latch arm 811 can be locked to the clip resin portion 85. For example, a non-penetration locking portion that does not penetrate from the accommodation groove 850 to an outer surface of the clip resin portion 85 may be formed.

An inclined surface 852A (FIG. 14) that facilitates movement of the clip 80 and the clip resin portion 85 from the separated position to the attachment position is provided inside (second sandwiching portion 82 side) the front end part 852 of the clip resin portion 85.

When the clip 80 is moved to the attachment position, the clip resin portion 85 is interposed between the first sandwiching portion 81 and the extending part 8A. Therefore, the whole of the clip resin portion 85 and the holder body portion 72 insulates the clip 80 and the coil 8 from each other. Likewise, the whole of the clip resin portion 85 and the holder body portion 72 insulate the clip 80 and the temperature sensor 10 from each other.

At this time, there are a case where an insulating coating is provided on the extending part 8A of the coil 8 and a case where no insulating coating is provided on the extending part 8A of the coil 8. Even in the case where no insulating coating is provided on the extending part 8A, the clip resin portion 85 can insulate the clip 80 and the coil 8 from each other.

To sufficiently insulate the clip 80 and the coil 8 from each other, a part of the clip resin portion 85 is preferably disposed so as to be interposed in a region of the clip 80 facing the coil 8. Therefore, when the clip 80 is attached to the coil 8, the locking hole 851 is preferably located above (upper side in FIG. 14) the upper wall 722 of the opening 724 in the assembling direction D3.

In the present embodiment, the inside of the first sandwiching portion 81 in the assembling direction D3 is substantially entirely covered with the clip resin portion 85, and the locking hole 851 is disposed outside the first sandwiching portion 81. Therefore, the clip resin portion 85 can more surely insulate the clip 80 and the coil 8 from each other.

Note that the curved portion 831 of the clip 80 is preferably exposed to the outside of the clip resin portion 85 in order not to influence the elastic deformation of the clip 80.

(Attachment of Temperature Detection Device to Coil)

Attachment of the temperature detection device according to the present embodiment is described below with reference to FIG. 14, FIG. 16, and FIG. 17.

Figure 17A:
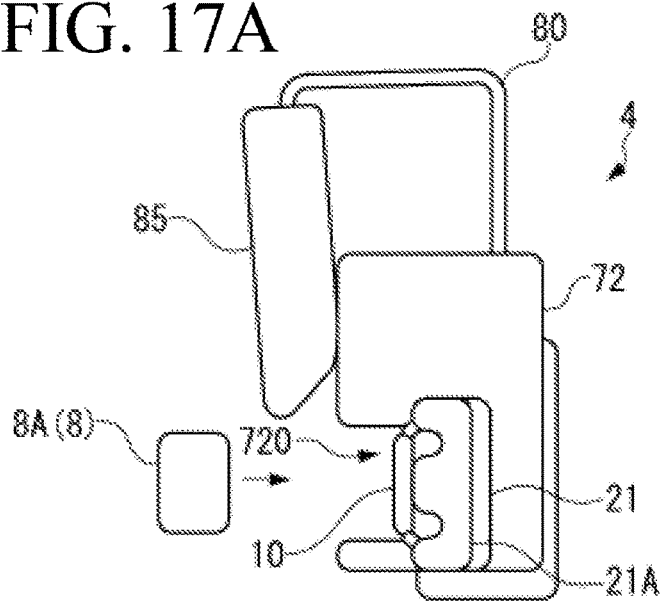
FIGS. 17A to 17C are diagrams illustrating a procedure of attaching the temperature detection device to a coil.
Figure 17B:
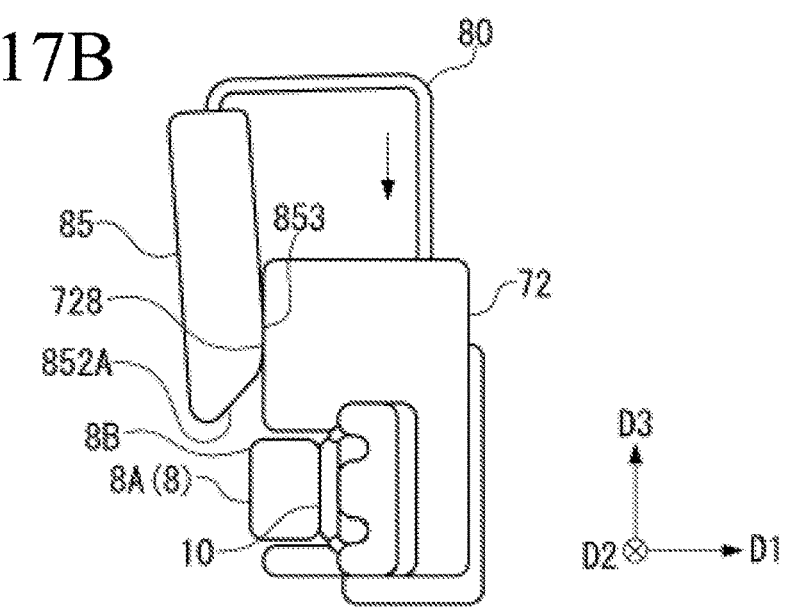

First, the clip 80 and the clip resin portion 85 illustrated in FIG. 17A are attached at the separated position. As illustrated in FIG. 17A and FIG. 16, when the clip 80 and the clip resin portion 85 are located at the separated position, the clip resin portion 85 is pressed against and fixed to the holder body portion 72 between the first sandwiching portion 81 and the second sandwiching portion 82 by the elastic force of the clip 80.

As described above, when the clip 80 and the clip resin portion 85 are located at the separated position, the whole of the opening 724 of the accommodation concave portion 720 is opened. Therefore, there is no resistance to insertion of the coil 8 into the opening 724, and the coil 8 can be smoothly accommodated in the accommodation concave portion 720.

Further, the accommodation concave portion 720 is opened in a direction (sandwiching direction D1) orthogonal to the assembling direction D3 in which the clip 80 and the clip resin portion 85 are slid.

Accordingly, the holder 70 is disposed on rear surface side of the extending part 8A of the coil 8. A person who performs assembly can easily and surely accommodate the extending part 8A in the accommodation concave portion 720 while viewing the extending portion 8A and the opening 724 from front side.

Next, the coil 8 is inserted into the accommodation concave portion 720 (FIG. 17B), and the clip coupling portion 83 is pushed or the like in the assembling direction D3 to move the clip 80 toward the attachment position while the coil 8 is positioned by the inner wall of the accommodation concave portion 720. As a result, the clip 80 is guided in the assembling direction D3 along the guide groove 725 of the holder body portion 72. The clip resin portion 85 follows the clip 80 and is moved in the assembling direction D3 on a side surface 728 of the holder body portion 72.

At this time, the inclined surface 852A provided at the front end part 852 of the clip resin portion 85 is moved in the assembling direction D3 while running on a corner 8B of the extending part 8A. When the clip 80 is further pushed in the assembling direction D3, the clip 80 is elastically deformed in a direction in which the clip 80 is opened outward, and the clip resin portion 85 is moved in parallel to the second sandwiching portion 82. A gap is provided between the holder body portion 72 and the clip resin portion 85.

Figure 17C:
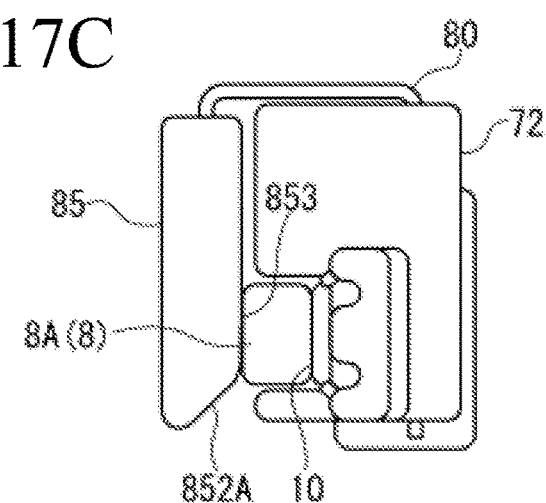

Further, as illustrated in FIG. 17C and FIG. 14, when the clip coupling portion 83 is pushed in the assembling direction D3, and the clip 80 and the clip resin portion 85 are moved up to a position (attachment position) where the curved portion 832 of the clip 80 abuts on the holder body portion 72, the opening 724 of the accommodation concave portion 720 is closed by the clip 80 and the clip resin portion 85, and the second latch arm 821 located in the locking hole 726 is moved to the locking notch 727 and is locked to the holder body portion 72.

At this time, almost of the whole of the inclined surface 852A of the clip resin portion 85 is displaced up to a position beyond the opening 724. Accordingly, the temperature sensor 10 is sandwiched between the flat part 853 of the clip resin portion 85 and the holder body portion 72, and is pressed against the coil 8 by the elastic force of the clip 80.

Since the opening 724 is closed by the clip resin portion 85 moved to the attachment position, the extending part 8A of the coil 8 disposed in the accommodation concave portion 720 is surrounded by the clip resin portion 85, the upper wall 722 and the lower wall 723 of the holder body portion 72, and the temperature sensor 10. This makes it possible to prevent the coil 8 from falling off from the accommodation concave portion 720 due to an external force such as impact.

Note that the opening 724 is not necessarily entirely closed as long as falling-off of the coil 8 is prevented.

Further, a movable range (stroke) corresponding to the dimension of the opening 724 in the assembling direction D3 is provided to each of the clip 80 and the clip resin portion 85. It is sufficient to provide a movable range necessary to open/close the opening 724 of the accommodation concave portion 720.

A stroke St1 (FIG. 16) provided to the clip 80 and the clip resin portion 85 is set to, for example, a length obtained by adding a dimension of the inclined surface 852A in the assembling direction D3 to the dimension of the opening 724 in the assembling direction D3. In this case, as illustrated in FIG. 16, the whole of the clip resin portion 85 including the inclined surface 852A is retreated from the opening 724 at a starting end (separated position) of the stroke St1. Therefore, the whole of the opening 724 is opened. At a terminal end of the stroke St1, the opening 724 is closed by the flat part of the clip resin portion 85 as illustrated in FIG. 14.

In the present embodiment, the length of the clip 80 is set to an appropriate dimension based on the dimension obtained by adding the stroke St1 of the clip 80 opening/closing the opening 724 and the length in the assembling direction D3 necessary to lock the first latch arm 811 to the inside of the locking hole 851 and in consideration of molding easiness.

(Action Effects)

As with the first to third embodiments, the temperature detection device 4 according to the present embodiment described above can be easily assembled to the coil 8 through simple operation of sliding the clip 80 in the assembling direction D3 after the coil 8 is positioned with respect to the temperature sensor 10 by the holder 70.

In the temperature detection device 4 according to the present embodiment, the holder 70, the clip 80, the clip resin portion 85, the temperature sensor 10, and the coil 8 are combined in a mutual-coupling state, and the coupling state is maintained by the elastic force of the clip 80 to attach the temperature detection device 4 to the coil 8, as with the first to third embodiments. Accordingly, as compared with a case where the temperature detection device 4 is attached to the coil 8 only by sandwiching the coil 8 by the elastic force of the clip 80, the elastic force necessary for the clip 80 to maintain the state where the components are integrated is small. As a result, the external force necessary to elastically deform the clip 80 in attachment to the coil 8 is small, which makes it possible to easily attach the temperature detection device 4 to the coil 8.

Accordingly, it is possible to improve assembling workability of the temperature detection device 4 to the coil 8.

Unlike the above-described second and third embodiments, the temperature detection device 4 according to the present embodiment does not adopt the configuration in which the two holders are relatively rotated around the hinge shaft. Therefore, the temperature detection device 4 has a simple configuration as compared with the second and third embodiments. Accordingly, it is possible to easily manufacture the temperature detection device 4 while suppressing cost.

In the present embodiment, in place of the hinge structure to secure the large opening 724 of the accommodation concave portion 720 in insertion of the coil 8, the clip resin portion 85 is configured so as to be interlockable with the clip 80. Therefore, the clip 80 and the clip resin portion 85 are retreated in the sliding direction (D3) with respect to the accommodation concave portion 720, which causes the opening 724 of the accommodation concave portion 720 to be opened in the direction (D1) intersecting the sliding direction.

According to such a configuration, it is unnecessary to expand the opening or to rotate the member in order to expand the opening. Further, the extending part 8A can be accommodated in the accommodation concave portion 720 and the temperature detection device 4 can be assembled to the coil 8 while the position of the accommodation concave portion 720 in which the whole of the opening 724 is opened and the position of the extending part 8A of the coil 8. This is excellent in workability.

Further, the clip 80 is locked to the clip resin portion 85 and the holder body portion 72 respectively by the first and second latch arms 811 and 821. Thus, the clip 80, the holder 70, and the clip resin portion 85 are hardly separated from one another against the external force such as impact during transportation, as compared with a case where the clip 80, the holder 70, and the clip resin portion 85 are integrated only by the elastic force of the clip 80.

The clip 30 according to the third embodiment (FIG. 11) is locked to the second holder 62 by the latch arm 36; however, in the present embodiment, the configuration is adopted in which the opening 724 of the accommodation concave portion 720 opening on the side is opened/closed by movement of the clip resin portion 85 and the clip resin portion 85 interlocking with the clip 80 while the clip 80 is locked to both of the holder 70 and the clip resin portion 85. Accordingly, it is possible to achieve both of simplification of the configuration and improvement of workability.

Fifth Embodiment

Next, a fifth embodiment of the present invention is described with reference to FIG. 18.

A temperature detection device 5 according to the fifth embodiment has a configuration substantially similar to the configuration of the temperature detection device 4 according to the fourth embodiment except that the temperature detection device 5 does not include the above-described clip resin portion 85 (FIG. 14).

Figure 18:
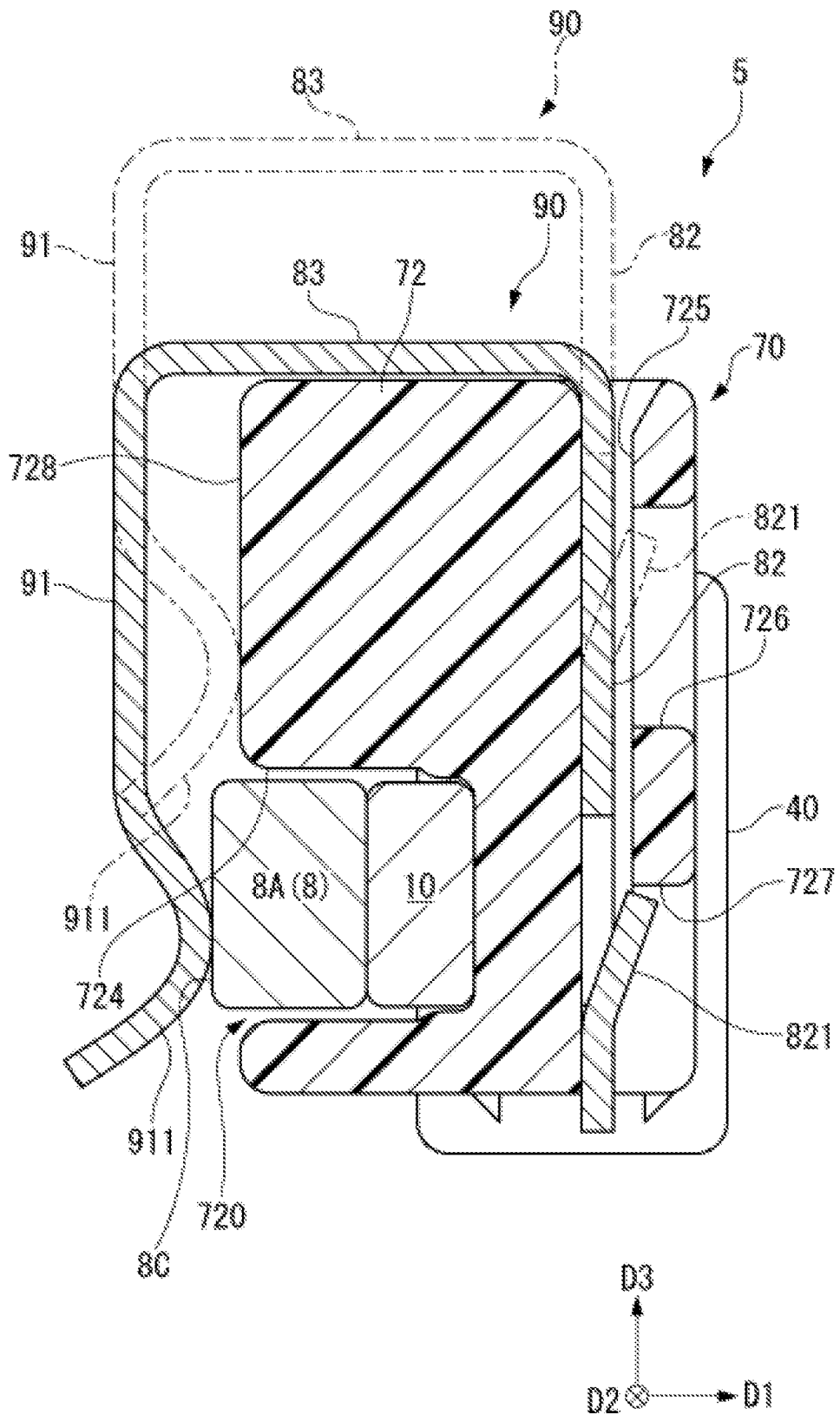
FIG. 18 is a perspective view illustrating a temperature detection device according to a fifth embodiment.

As illustrated in FIG. 18, the temperature detection device 5 includes the temperature sensor 10, the holder 70 holding the temperature sensor 10, the clip 90 (elastic body) sandwiching the temperature sensor 10 and the extending part 8A of the coil 8, and the wire holding portion 40 (refer to FIG. 12).

The clip 90 is provided on the holder 70 so as to be movable to the separated position (illustrated by alternate long and short dash line) retreated from the opening 724 of the accommodation concave portion 720 in the assembling direction D3, and the attachment position (illustrated by solid line) facing the opening 724, as with the temperature detection device 4 according to the fourth embodiment.

When the clip 90 is moved from the separated position to the attachment position illustrated by the solid line, the clip 90 sandwiches the temperature sensor 10 and the coil 8 with elastic force, and prevents the coil 8 from coming off from the opening 724 of the accommodation concave portion 720.

The clip 90 includes a first sandwiching portion 91, the second sandwiching portion 82, and the clip coupling portion 83 that coupes the first sandwiching portion 91 and the second sandwiching portion 82. The clip 90 is formed by, for example, bending an elastic metal plate. As illustrated in FIG. 18, the clip coupling portion 83, the first sandwiching portion 91, and the second sandwiching portion 82 of the clip 90 are integrally formed by bending right and left ends of the clip coupling portion 83 toward the assembling direction D3. As a result, the clip 90 is formed to have a U-shape as a whole as viewed from the extending direction D2 side. In the present embodiment, the case where the first sandwiching portion 91 and the second sandwiching portion 82 are bend in a direction orthogonal to the clip coupling portion 83 as viewed from the extending direction D2 side is illustrated; however, the bending direction of the clip 90 is not limited to the direction orthogonal to the sandwiching direction D1 as long as the clip 90 can maintain the elastic force enough to prevent the coil 8 from coming off from the opening 724 of the accommodation concave portion 720. To cause the clip 90 to exert stronger elastic force to prevent coming-off of the coil 8, an opening between an end part of the first sandwiching portion 91 and an end part of the second sandwiching portion 82 may be made narrower.

A coming-off preventing portion 911 that faces the opening 724 of the accommodation concave portion 720 when the clip 90 is moved to the attachment position is provided on one end side of the first sandwiching portion 91 in the assembling direction D3.

The coming-off preventing portion 911 has a curved shape protruding toward the second sandwiching portion 82, formed by bending the one end side of the first sandwiching portion 91 in the assembling direction D3 toward the second sandwiching portion 82. In other words, a distance between a protruding end of the coming-off preventing portion 911 and the second sandwiching portion 82 becomes smaller than a dimension from a side surface 8C of the extending part 8A to the second sandwiching portion 82. Therefore, the coming-off preventing portion 911 presses the extending part 8A of the coil 8 against the temperature sensor 10 by the elastic force of the clip 90 when the clip 90 is assembled to the holder 70.

An unillustrated insulating cover film is provided on the extending part 8A of the coil 8 at least over a range with which the coming-off preventing portion 911 comes into contact.

The clip 90 has the configuration similar to the configuration of the clip 80 (FIG. 14) according to the fourth embodiment except for the shape of the first sandwiching portion 91.

When the protruding dimension of the coming-off preventing portion 911 toward the second sandwiching portion 82 is appropriately set, the coming-off preventing portion 911 can press the coil 8 against the temperature sensor 10 irrespective of tolerance of the temperature sensor 10 and the coil 8. It is accordingly unnecessary to cause a part of the extending part 8A to protrude from the accommodation concave portion 720 in consideration of the tolerance. The side surface 8C of the extending part 8A may be retreated on the second sandwiching portion 82 side relative to the position of the opening 724.

When the clip 90 is located at the separated position as illustrated by an alternate long and short dash line in FIG. 18, the latch arm 821 of the second sandwiching portion 82 is locked to the holder body portion 72 at the position of the locking hole 726, and the coming-off preventing portion 911 is pressed against the holder body portion 72 by the elastic force of the clip 90. When the extending part 8A of the coil 8 is inserted into the accommodation concave portion 720 from the opening 724 in this state, the extending part 8A is held inside the accommodation concave portion 720 while being positioned with respect to the temperature sensor 10.

Thereafter, when the clip 90 is moved toward the attachment position, the coming-off preventing portion 911 slides on the side surface 728 of the holder body portion 72 while the second sandwiching portion 82 is guided by the guide groove 725 along the assembling direction D3.

When the clip 90 is moved up to the position where the coming-off preventing portion 911 faces the opening 724 of the accommodation concave portion 720, the coming-off preventing portion 911 comes into contact with the coil 8 to prevent the coil 8 from coming off from the accommodation concave portion 720. At this time, the clip 90 is locked to the holder body portion 72 by the latch arm 821. Accordingly, the temperature detection device 5 is maintained in the state of being assembled to the coil 8 without separation of the holder 70, the clip 90, the temperature sensor 10, and the coil 8.

The temperature detection device 5 according to the present embodiment can achieve action effects similar to the action effects according to the fourth embodiment by the simpler configuration without the clip resin portion 85.

Other than the above, the configurations described in the above-described embodiments can be selected or appropriately modified without departing from the scope of the present invention.

REFERENCE SIGNS LIST 1 to 5 Temperature detection device
8 Coil
8A Extending part
8B Corner
10 Temperature sensor
10A Front end part
11 Thermosensitive element
12 Cover
12A Contact surface
20 Holder
21 Sensor holding portion
21A One end part
21B Other end part
22 Holder body portion
22A Hole
23 Concave portion
23A Positioning portion
30, 80, 90 Clip (elastic body)
31 First sandwiching portion
32 Second sandwiching portion
33 Clip coupling portion
34 Locked portion
35 Curved portion
40 Wire holding portion
41 Hole
50 Holder
51 First holder
52 Second holder
53 Hinge
53A Shaft
54 Gap
60 Holder
61 First holder
62 Second holder
63 Hinge
63A Hinge shaft
63B Rotation regulation portion
70 Holder
72 Holder body portion
720 Accommodation concave portion
721 Side wall
722 Upper wall
723 Lower wall
724 Opening
725 Guide groove
726 Locking hole
727 Locking notch
728 Side surface
729 Outer wall
81 First sandwiching portion
81A Front end
811 First latch arm
82 Second sandwiching portion
821 Second latch arm
85 Clip resin portion (contact member)
850 Accommodation groove
851 Locking hole
852 Front end part
852A Inclined surface
91 First sandwiching portion
911 Coming-off preventing portion
111 Body portion
112 Electric wire
112A Coating
211 Groove
211A Wall
212 Stopper
213 Holding piece
214 Direction changing portion
214A Wall
216 Locking projection
221 First holder body portion
221A Projection piece
221B Separation locking portion
221C Support surface
222 First holder body portion
222A Lower end
222B Separation locking portion
222C Support surface
223 Coupling portion
223A Wall
223B Support surface
223C Inclined surface
224 Guide
224A Guide wall
225 Wall
230 Opening
231 to 234 Wall
511 End part
512 Step part
521 End part
522 Groove
523 Concave portion 523A Positioning portion
621 Separation locking portion
622 Sandwiching locking portion
623 Guide groove
624 Hole
625 Engagement hole
626 Inclined surface
627 Mating portion
628 Concave portion
628A Positioning portion
D1 Sandwiching direction
D2 Extending direction
D3 Assembling direction

The invention claimed is:

1. A temperature detection device to be assembled to a coil, the temperature detection device comprising:
a temperature sensor that includes a thermosensitive element detecting temperature of the coil;
a holder that holds the temperature sensor and positions the coil with respect to the temperature sensor; and
an elastic body configured to sandwich the temperature sensor and the coil that are positioned by the holder, wherein
the elastic body is movable to an attachment position where the elastic body is attached to the holder to sandwich the temperature sensor and the coil, and a separated position where the elastic body is separated from the temperature sensor when the coil is positioned with respect to the temperature sensor by the holder.

2. The temperature detection device according to claim 1, wherein the elastic body is attached to the holder to be movable between the separated position and the attachment position.

3. The temperature detection device according to claim 2, wherein the holder includes a guide guiding the elastic body for movement between the separated position and the attachment position.

4. The temperature detection device according to claim 1, wherein the holder includes at least one of a locking portion that locks the elastic body to the separated position, and a locking portion that locks the elastic body to the attachment position.

5. The temperature detection device according to claim 4, wherein one of the locking portion and a locked portion of the elastic body locked by the locking portion is a latch arm that is locked to the other of the locking portion and the locked portion and prevents the elastic body from coming off from the holder.

6. The temperature detection device according to claim 1, wherein
the holder includes a concave portion into which the coil is inserted, and
the coil is positioned with respect to the temperature sensor by an inner wall of the concave portion.

7. The temperature detection device according to claim 1, wherein
the holder includes a first holder that is located on one side in a sandwiching direction, and a second holder that is located on another side in the sandwiching direction, the sandwiching direction being a direction in which the temperature sensor and the coil are sandwiched by the elastic body,
the first holder and the second holder are relatively rotatable around a shaft of a hinge, and
the coil is insertable into a gap between the first holder and the second holder while the elastic body is separated from the temperature sensor.

8. The temperature detection device according to claim 7, wherein
the holder includes a locking portion that locks the elastic body to the separated position,
the shaft of the hinge is located near the locking portion, and
the first holder and the second holder are assembled, by the elastic body separated from the temperature sensor, to be relatively rotatable around the shaft of the hinge.

9. The temperature detection device according to claim 7, wherein
the hinge is provided integrally with one of the first holder and the second holder, and
the shaft of the hinge includes a rotation regulation portion that is pressed against the other of the first holder and the second holder to regulate relative rotation of the first holder and the second holder.

10. The temperature detection device according to claim 7, wherein
the hinge is provided integrally with one of the first holder and the second holder,
the other of the first holder and the second holder includes an engagement portion with which the shaft of the hinge engages, and
the first holder and the second holder are assembled by the shaft of the hinge and the engagement portion.

11. The temperature detection device according to claim 1, wherein
the holder sandwiches and positions the temperature sensor and the coil, and
the elastic body sandwiches the temperature sensor and the coil from outside of the holder through the holder.

12. The temperature detection device according to claim 1, wherein
the holder includes a guide guiding the elastic body for movement between the separated position and the attachment position, and
the elastic body is a clip formed in a concave shape from a plate member, and is mated with the guide at the attachment position.

13. The temperature detection device according to claim 1, wherein
the holder includes a concave portion into which the coil is inserted,
the concave portion is opened on one side in a sandwiching direction when the elastic body is located at the separated position, the sandwiching direction being a direction in which the temperature sensor and the coil are sandwiched by the elastic body, and
the elastic body is configured to face an opening of the concave portion by being moved from the separated position to the attachment position.

14. The temperature detection device according to claim 13, wherein the elastic body is mounted with an insulating contact member that is moved with the elastic body and comes into contact with the coil when the elastic body is moved to the attachment position.

15. The temperature detection device according to claim 14, wherein one of the contact member and the elastic body includes a latch arm to be locked to the other of the contact member and the elastic body.

16. The temperature detection device according to claim 1, further comprising a wire holding portion provided on the holder, wherein
the thermosensitive element includes a thermosensitive body detecting temperature, and an electric wire led from the thermosensitive body, the elastic body sandwiches the temperature sensor and the coil at a position corresponding to the thermosensitive body, and the wire holding portion holds the electric wire to the holder.

17. The temperature detection device according to claim 1, wherein the elastic body is movable along a direction orthogonal to both of a sandwiching direction in which the temperature sensor and the coil are sandwiched, and a longitudinal direction of a part of the coil to which the temperature detection device is assembled.

18. An assembly, comprising:
a temperature detection device to be assembled to a coil; and
a coil element configuring a part of the coil, wherein
the temperature detection device includes a temperature sensor that includes a thermosensitive element detecting temperature of the coil, a holder that holds the temperature sensor and positions the coil with respect to the temperature sensor, and an elastic body configured to sandwich the temperature sensor and the coil that are positioned by the holder, and
the elastic body is movable to an attachment position where the elastic body is attached to the holder to sandwich the temperature sensor and the coil, and a separated position where the elastic body is separated from the temperature sensor when the coil is positioned with respect to the temperature sensor by the holder.

* * * * *